US007483637B2

(12) United States Patent
Gumaste et al.

(10) Patent No.: US 7,483,637 B2
(45) Date of Patent: *Jan. 27, 2009

(54) OPTICAL RING NETWORK WITH OPTICAL SUBNETS AND METHOD

(75) Inventors: Ashwin Anil Gumaste, Dallas, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1097 days.

This patent is subject to a terminal disclaimer.

(21) Appl. No.: 10/722,856

(22) Filed: Nov. 26, 2003

(65) Prior Publication Data

US 2005/0111495 A1 May 26, 2005

(51) Int. Cl.
*H04J 14/02* (2006.01)
(52) U.S. Cl. ............................... 398/83; 398/58
(58) Field of Classification Search .......... 398/3, 398/4, 59, 83, 84, 85, 58
See application file for complete search history.

(56) References Cited

U.S. PATENT DOCUMENTS

| 5,179,548 | A | 1/1993 | Sandesara |
| 5,327,427 | A | 7/1994 | Sandesara |
| 5,414,548 | A | 5/1995 | Tachikawa et al. ......... 359/130 |
| 5,576,875 | A | 11/1996 | Chawki et al. ............. 359/125 |
| 5,615,036 | A | 3/1997 | Emura ..................... 359/124 |
| 5,771,112 | A | 6/1998 | Hamel et al. ............. 359/128 |
| 5,774,244 | A | 6/1998 | Tandon et al. ............ 359/125 |
| 5,778,118 | A | 7/1998 | Sridhar .................... 385/24 |
| 5,903,371 | A | 5/1999 | Arecco et al. ............ 359/119 |
| 5,930,016 | A | 7/1999 | Brorson et al. ........... 359/127 |
| 6,097,696 | A | 8/2000 | Doverspike .............. 370/216 |
| 6,122,096 | A | 9/2000 | Fatehi .................... 359/341 |

(Continued)

FOREIGN PATENT DOCUMENTS

EP      0 677 935 A1    4/1995

(Continued)

OTHER PUBLICATIONS

Chlamtac et al., "Lightpath Communications: An Approach to High Bandwidth Optical WAN's," *IEEE Transactions on Communications*, vol. 40, No. 7, Jul. 1992, 12 pages.

(Continued)

*Primary Examiner*—Christina Y Leung
(74) *Attorney, Agent, or Firm*—Baker Botts L.L.P.

(57) ABSTRACT

In one embodiment, a method of passively adding traffic from a first optical network to a second optical network includes receiving ingress traffic from an optical ring of the first network at a node coupled to the first network, generating a first and second copy of the traffic, passively forwarding the first and second copies of the traffic, splitting the second copy of the traffic into multiple substantially identical copies, and filtering at least one of the copies of the second copy of the traffic into one or more constituent wavelengths. The method further includes selectively forwarding the signal in one or more constituent wavelengths of the second copy of the traffic to a node coupled to the second network, receiving the forwarded signal in one or more wavelengths at the node, and adding the forwarded signal in one or more wavelengths to an optical ring of the second network.

12 Claims, 16 Drawing Sheets

U.S. PATENT DOCUMENTS

| | | | |
|---|---|---|---|
| 6,137,608 A | 10/2000 | White | 359/128 |
| 6,160,648 A | 12/2000 | Öberg et al. | 359/110 |
| 6,192,173 B1 | 2/2001 | Solheim et al. | 385/24 |
| 6,236,498 B1 | 5/2001 | Freeman et al. | 359/341 |
| 6,295,146 B1 | 9/2001 | Nathan et al. | 359/119 |
| 6,310,994 B1 | 10/2001 | Jones et al. | 385/24 |
| 6,331,906 B1 | 12/2001 | Sharma et al. | 359/119 |
| 6,344,911 B1 | 2/2002 | Dailey, Jr. et al. | 359/127 |
| 6,351,582 B1 | 2/2002 | Dyket et al. | 385/24 |
| 6,400,859 B1 | 6/2002 | de Boer et al. | |
| 6,426,817 B1 | 7/2002 | Tomita | 359/127 |
| 6,456,406 B1 | 9/2002 | Arecco et al. | 359/119 |
| 6,456,407 B1 | 9/2002 | Tammela et al. | 359/119 |
| 6,486,988 B1 | 11/2002 | Lewis et al. | 359/127 |
| 6,525,852 B1 | 2/2003 | Egnell | 359/127 |
| 6,580,549 B1 | 6/2003 | Kinoshita | |
| 6,590,681 B1 | 7/2003 | Egnell et al. | 359/127 |
| 6,616,349 B1 | 9/2003 | Li et al. | 398/4 |
| 6,631,018 B1 | 10/2003 | Milton et al. | 359/119 |
| 6,658,013 B1 | 12/2003 | de Boer et al. | 370/404 |
| 6,701,085 B1 | 3/2004 | Muller | |
| 6,895,184 B2 | 5/2005 | Way | |
| 7,321,729 B2 * | 1/2008 | Gumaste et al. | 398/59 |
| 2001/0015836 A1 | 8/2001 | Kim et al. | 359/124 |
| 2001/0040710 A1 | 11/2001 | Sharratt et al. | |
| 2001/0050790 A1 | 12/2001 | Graves et al. | |
| 2002/0003639 A1 | 1/2002 | Arecco et al. | 359/119 |
| 2002/0030869 A1 | 3/2002 | Okazaki et al. | 359/128 |
| 2002/0044315 A1 | 4/2002 | Sugawara et al. | |
| 2002/0067523 A1 | 6/2002 | Way | 359/119 |
| 2002/0101633 A1 | 8/2002 | Onaka et al. | |
| 2002/0126334 A1 | 9/2002 | Milton et al. | |
| 2002/0131118 A1 | 9/2002 | Chiaroni et al. | |
| 2002/0145779 A1 | 10/2002 | Strasser et al. | |
| 2002/0149817 A1 | 10/2002 | Kiliccote et al. | 359/119 |
| 2002/0186432 A1 | 12/2002 | Roorda et al. | |
| 2002/0186439 A1 | 12/2002 | Buabbud et al. | 359/173 |
| 2002/0191898 A1 | 12/2002 | Evans et al. | 385/24 |
| 2002/0196491 A1 | 12/2002 | Deng et al. | 359/124 |
| 2003/0170020 A1 | 9/2003 | Chaudhuri et al. | |
| 2004/0208575 A1 | 10/2004 | Takegushi et al. | |
| 2005/0111495 A1 | 5/2005 | Gumaste et al. | |

FOREIGN PATENT DOCUMENTS

| | | |
|---|---|---|
| EP | 0 668 674 | 8/1995 |
| EP | 0 716 521 A2 | 6/1996 |
| EP | 0 907 266 A2 | 4/1999 |
| EP | 1 161 014 A1 | 12/2001 |
| EP | 1 265 451 | 12/2002 |
| EP | 1 564 933 | 8/2005 |
| GB | 2 359 433 | 8/2001 |
| JP | 11-145910 | 5/1999 |
| WO | WO 96/32787 | 10/1996 |
| WO | WO 98/52314 | 11/1998 |
| WO | WO 99/03231 | 1/1999 |
| WO | WO 99/65164 | 12/1999 |
| WO | WO 03/104849 | 12/2003 |
| WO | WO 03/104849 A2 | 12/2003 |
| WO | WO 2004/107617 | 12/2004 |

OTHER PUBLICATIONS

Narula-Tam et al., "Efficient Routing and Wavelength Assignment for Reconfigurable WDM Networks," *IEEE Journal on Selected Areas in Communications*, vol. 20, No. 1, Jan. 2002, 14 pages.

Grenfeldt, "ERION-Ericsson optical networking using WDM technology," Ericsson Review No. 3, pp. 132-137, 1998.

Ashmead, "ROADMap for the Metro Market," Fiberoptic Product News, 3 pages (36, 38, and 40), Oct. 2001.

Batchellor, "Optical Networking the Ericsson Way," Ericsson Limited, Business Unit Transport and Cable Networks, pp. 1-4, Feb. 22, 2002.

Bacque, B. et al., "R-OADM Architecture—Now you can Control the Light," Tropic Networks, pp. 1-11, 2003.

U.S. Appl. No. 10/108,734, entitled "Method and System for Control Signaling in an Open Ring Optical Network," filed Mar. 27, 2002.

U.S. Appl. No. 10/108,741, entitled "Method and System for Testing During Operation of an Open Ring Optical Network," filed Mar. 27, 2002.

U.S. Appl. No. 10/112,022, entitled "Flexible Open Ring Optical Network and Method," filed Mar. 28, 2002.

U.S. Appl. No. 10/158,523, entitled "Optical Ring Network with Optical Subnets and Method," filed May 29, 2002.

U.S. Appl. No. 10/158,348, entitled "Multiple Subnets in an Optical Ring Network and Method," filed May 29, 2002.

U.S. Appl. No. 10/159,499, entitled "Combining and Distributing Amplifiers for Optical Network and Method," filed May 30, 2002.

U.S. Appl. No. 10/159,307, entitled "Optical Add/Drop Node and Method," filed May 30, 2002.

U.S. Appl. No. 10/159,464, entitled "Passive Add/Drop Amplifier for Optical Network and Method," filed May 30, 2002.

U.S. Appl. No. 10/246,053, entitled "Optical Network and Distributed Sub-Band Rejections," filed Sep. 17, 2002.

U.S. Appl. No. 10/262,818, entitled "Optical Ring Network with Hub Node and Method," filed Oct. 1, 2002.

U.S. Appl. No. 10/448,169, entitled "Optical ring Network with Selective Signal Regeneration and Wavelength Conversion," filed May 29, 2003.

U.S. Appl. No. 10/627,548, entitled "System and Method for Communicating Optical Traffic Between Ring Networks," filed Jul. 25, 2003.

U.S. Appl. No. 10/629,021, entitled "Optical Network with Sub-Band Rejection and Bypass," filed Jul. 28, 2003.

U.S. Appl. No. 10/695,711, entitled "Method and System for Increasing Network Capacity in a Optical Network," filed Oct. 29, 2003.

Toba, H., et al., "Demonstration of Optical FDM Based Self-Healing Ring Network Employing Arrayed-Waveguide-Granting ADM Filters and EDFAs," NTT Transmission Syrstems Laboratories, pp. 263-266, Sep. 24, 1994.

Notification of Transmittal of the International Search Report or the Declaration (PCT Rule 44.1) mailed Mar. 17, 2004 (9 pages) re International Application No. PCT/US 03/16193.

Kinoshita et al., "Flexible Twin Open Ring Metro WDM Network," OECC, pp. 713-714, Oct. 2003.

Tian et al., "OUPSR Protected Flexible Metro WDM Network," ECOC, pp. 826-827, 2003.

Boskovic et al., "Broadcast and Select OADM Nodes Application and Performance Trade-offs," OFC, pp. 158-159, 2002.

Kinoshita et al. "Flexible Metro WDM Network with Photonic Domains", Fujitsu Laboratories of America, Inc., 3 pages, Feb. 24-26, 2004.

Suzuki et al., "Prototype of 12.5GHz-Spaced Tapped-Type OADM for DWDM Metro Ring Networks," ECOC-IOOC Proceedings—vol. 4, pp. 902-903, Sep. 21-25, 2003.

Wolde, J., et al., "Optical Ethernet Metro Access Network Protype: Implementation and Results," ECOC-IOOC 2003, 3 pages, Sep. 21-25, 2003.

Communication from the European Patent Office, European Search Report for Application No. EP 04 02 6005, May 3, 2006, 3 pages.

Gumaste et al., "Benefits of Optical Subnets in WDM Ring Networks," First International Conference on Optical Communications and Networks, Nov. 11-14, 2002, World Scientific Singapore, p. 99-103.

S. Kinoshita et al., "Flexible Twin Open Ring Metro WDM Network," OECC, pp. 713-714, Oct. 2003.

C. Tian et al., "OUPSR Protected Flexible Metro WDM Network," ECOC, pp. 826-827, 2003.

A. Boskovic, et al., "Broadcast and Select OADM nodes Application and Performance Trade-offs," OFC, pp. 158-159, 2002.

Y. Kai et al., "Photonic Gateway with μs-Order Wavelength Path Control for Metro Access Networks," ECOC, pp. 512-513, 2003.

A.A. Gumaste et al., U.S. Appl. No. 10/448,169, "Optical Ring Network with Selective Signal Regeneration and Wavelength Conversion," pending, 49 pages and 9 pages of drawings, May 29, 2003.

Takeguchi et al., Bifurcated Traffic and Channel Assignment (BITCA) to Interconnect Metro Rings, Tuesday Morning, OFC 2002, Mar. 19, 2002, pp. 39-41.

Communication from the European Patent Office, European Search Report for Application No. EP 05 00 1571, Jun. 17, 2005, 3 pages.

Notification of Transmittal of the International Search Report or the Declaration (PCT Rule 44.1) mailed Oct. 28, 2004 (5 pages) re International Application No. PCT/US 2004/016352.

Communication from the European Patent Office, European Search Report for Application No. EP 05 01 3846, Oct. 18, 2005, 4 pages.

* cited by examiner

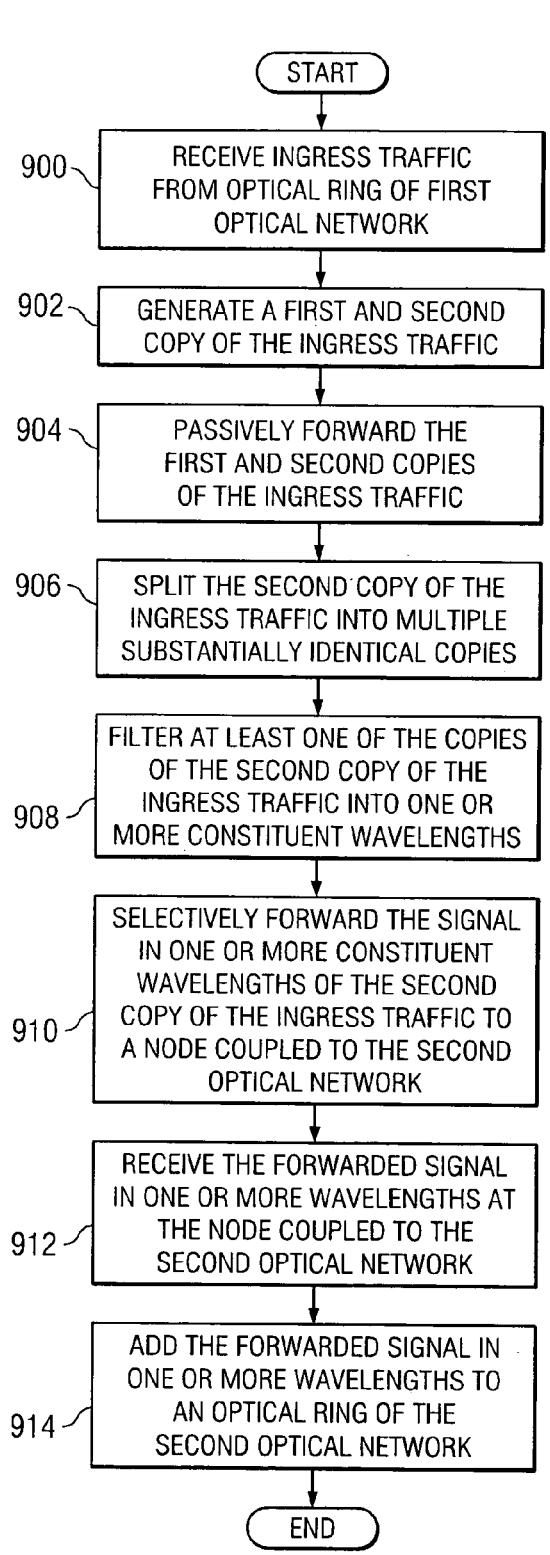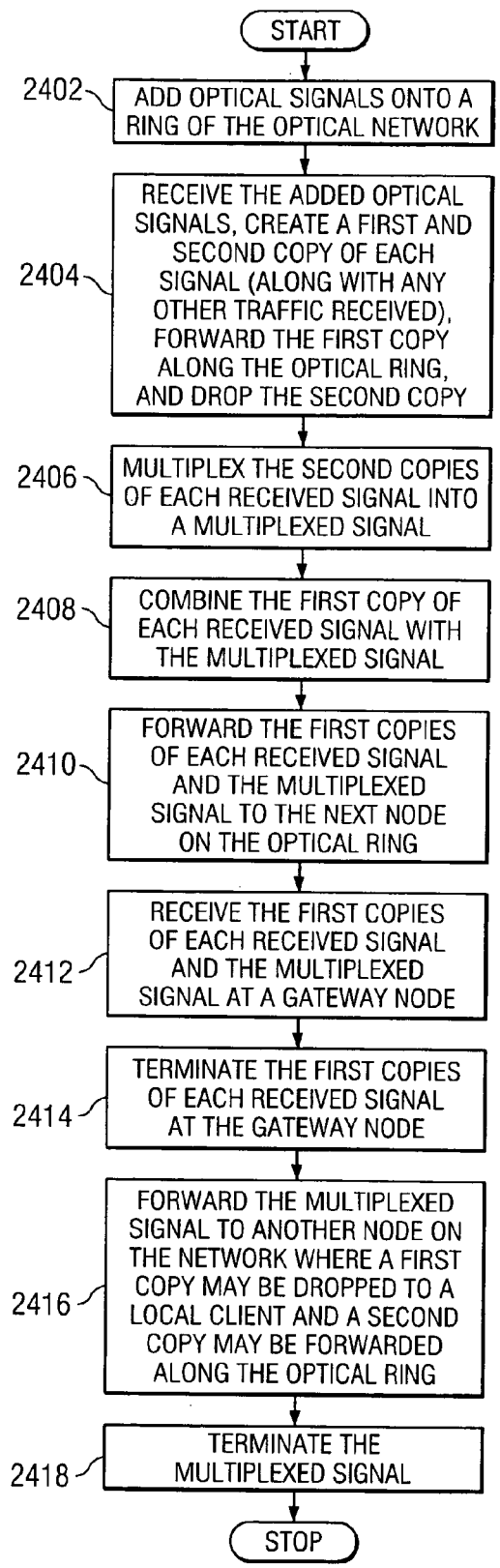
FIG. 13
FIG. 17

OPTICAL RING NETWORK WITH OPTICAL SUBNETS AND METHOD

TECHNICAL FIELD OF THE INVENTION

The present invention relates generally to optical transport systems, and more particularly to an optical ring network with optical subnets and method.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

The typology in which WDM and DWDM networks are built plays a key role in determining the extent to which such networks are utilized. Ring topologies are common in today's networks. WDM add/drop units serve as network elements on the periphery of such optical rings. By using WDM add/drop equipment at each network element (node), the entire composite signal can be fully demultiplexed into its constituent channels and switched (added/dropped or passed through).

SUMMARY

The present invention provides an optical ring network having components that provide selective signal regeneration and signal wavelength conversion to provide for protection switching in a network of passive add/drop nodes.

According to one embodiment of the present invention, a method of passively adding traffic from a first optical network to a second optical network includes receiving ingress traffic from an optical ring of the first network at a node coupled to the first network, generating a first and second copy of the traffic, passively forwarding the first and second copies of the traffic, splitting the second copy of the traffic into multiple substantially identical copies, and filtering at least one of the copies of the second copy of the traffic into one or more constituent wavelengths. The method further includes selectively forwarding the signal in one or more constituent wavelengths of the second copy of the traffic to a node coupled to the second network, receiving the forwarded signal in one or more wavelengths at the node, and adding the forwarded signal in one or more wavelengths to an optical ring of the second network.

According to another embodiment of the present invention, a method of transmitting multiplexed traffic on an optical ring of an optical network comprising a plurality of add/drop nodes and a plurality of gateway nodes includes receiving ingress optical traffic comprising a plurality of optical signals at a first add/drop node coupled to a first ring of the optical network (each signal in a separate channel) forwarding the received optical traffic to a second add/drop node on the network, and generating a first copy and a second copy of each of the received optical signals at the second add/drop node. The method also includes multiplexing the signals contained in the second copy of each of the received signals into a multiplexed signal, adding the traffic contained in the multiplexed signal to the traffic contained in the first copy of each of the received signals, and forwarding an optical signal containing at least the traffic contained in the multiplexed signal and the traffic contained in the in the first copies of each of the received signals to a gateway node in the network. The method further includes receiving the optical signal containing at least the traffic contained in the multiplexed signal and the traffic contained in the in the first copies of each of the received signals at a first optical coupler of the gateway node. The first optical coupler may forward a first copy and a second copy of the optical signal received at the gateway node. The method also includes terminating the traffic contained in the first copy of each of the received signals at the gateway node and forwarding the traffic in the multiplexed signal to another node in the network from the gateway node.

Technical advantages of one or more embodiments of the present invention may include providing an improved optical ring network. In particular embodiments, such a network may include add/drop nodes or gateways of one optical ring network that may be coupled to add/drop nodes or gateways coupled to another optical ring network to allow traffic to be passively added and/or dropped from one network to the other network.

Another technical advantage of certain embodiments is the ability to provide an optical ring network that is able to multiplex the traffic contained in multiple optical signals into a single optical signal so that wavelength resources may be conserved on the network.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

FIG. 13 illustrates an example method for passively adding traffic from one optical network to another optical network, according to one embodiment of the present invention;

FIG. 17 illustrates an example method for transmitting multiplexed traffic on an optical ring network.

DETAILED DESCRIPTION

Figure 1:
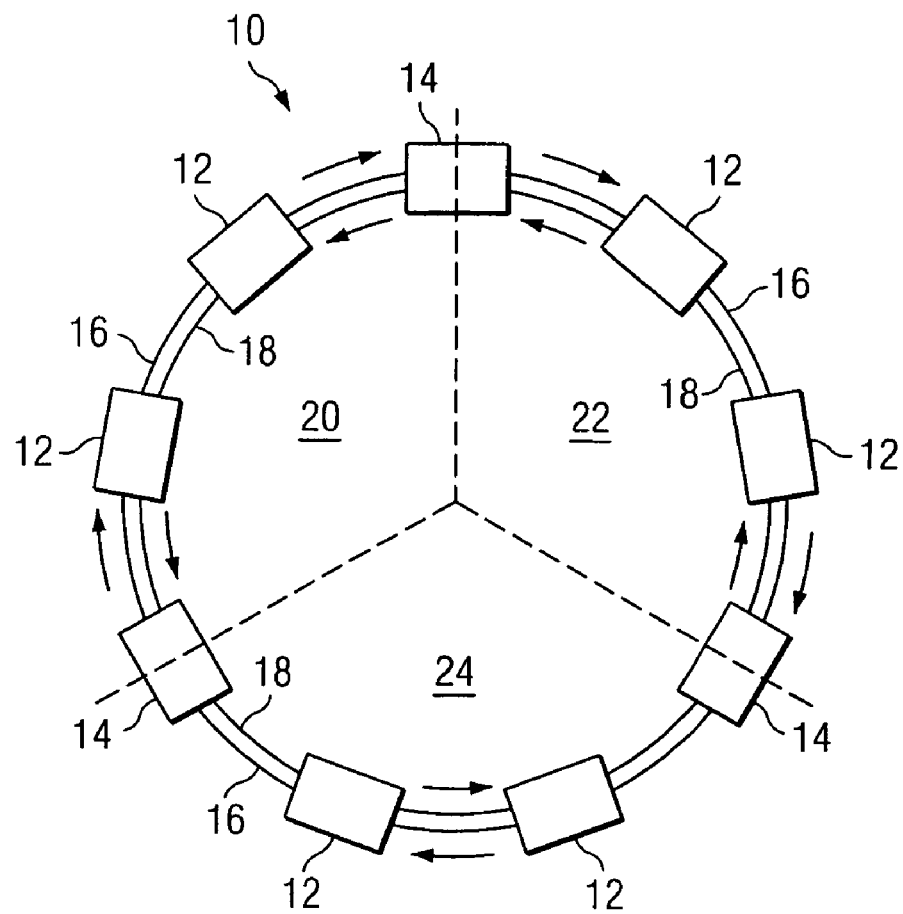
FIG. 1 is a block diagram illustrating an example optical network in accordance with one embodiment of the present invention.

FIG. 1 is a block diagram illustrating an optical network 10 in accordance with one embodiment of the present invention. In accordance with this embodiment, the network 10 is an optical ring. An optical ring may include, as appropriate, a single, unidirectional fiber, a single, bi-directional fiber, or a plurality of uni- or bi-directional fibers. In the illustrated embodiment, the network 10 includes a pair of unidirectional fibers, each transporting traffic in opposite directions, specifically a first fiber, or ring, 16 and a second fiber, or ring, 18. Rings 16 and 18 connect a plurality of add/drop nodes (ADNs) 12 and optical gateways 14. Network 10 is an optical network in which a number of optical channels are carried over a common path in disparate wavelengths/channels. Network 10 may be an wavelength division multiplexing (WDM), dense wavelength division multiplexing (DWDM), or other suitable multi-channel network. Network 10 may be used as a short-haul metropolitan network, a long-haul intercity network, or any other suitable network or combination of networks.

Referring to FIG. 1, optical information signals are transmitted in different directions on rings 16 and 18. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 16 is a clockwise ring in which traffic is transmitted in a clockwise direction. The second ring 18 is a counterclockwise ring in which traffic is transmitted in a counterclockwise direction. ADNs 12 are each operable to passively add and drop traffic to and from the rings 16 and 18. In particular, each ADN 12 receives traffic from local clients and adds that traffic to the rings 16 and 18. At the same time, each ADN 12 receives traffic from the rings 16 and 18 and drops traffic destined for the local clients. As used throughout this description and the following claims, the term "each" means every one of at least a subset of the identified items. In adding and dropping traffic, the ADNs 12 may combine data from clients for transmittal in the rings 16 and 18 and may drop channels of data from the rings 16 and 18 for clients. Traffic may be dropped by making the traffic available for transmission to the local clients. Thus, traffic may be dropped and yet continue to circulate on a ring. ADNs 12 communicate the traffic on rings 16 and 18 regardless of the channel spacing of the traffic—thus providing "flexible" channel spacing in the ADNs 12. "Passively" in this context means the adding or dropping of channels without power, electricity, and/or moving parts. An active device would thus use power, electricity or moving parts to perform work. In a particular embodiment of the present invention, traffic may be passively added to and/or dropped from the rings 16 and 18 by splitting/combining, which is without multiplexing/demultiplexing, in the transport rings and/or separating parts of a signal in the ring.

Rings 16 and 18 and the ADNs 12 are subdivided into sub-networks or "subnets" 20, 22, and 24, with gateways 14 forming the subnet boundaries. A subnet may be defined as a subset of nodes on a ring whose wavelengths are not isolated from each other and which may comprise traffic streams from nodes within the subnet, but whose wavelengths are isolated from traffic streams from other nodes on the ring, except for a portion of wavelengths (at least during normal operations) that transport traffic streams that pass through, enter or exit the subnet in order to reach their destination nodes. The gateways may be operable to terminate traffic channels from a subnet that have reached their destination ADNs (including those that have or will reach their destination nodes in an opposite direction) and to forward traffic channels from a subnet that have not reached their destination ADNs. Further details regarding the gateways 14 are described below in reference to FIG. 4A.

Within each subnet, traffic is passively added to and passively dropped from the rings 16 and 18, channel spacing is flexible, and the nodes are free to transmit and receive signals to and from nodes within the subnet. Such traffic may be referred to as "intra-subnet traffic." Another portion of the traffic—"inter-subnet traffic"—may travel to and from nodes in another subnet. Such inter-subnet traffic traverses or travels within at least part of two subnets. Because an intra-subnet traffic stream utilizes its wavelength/channel only within the subnet in which it travels, the wavelength/channel used for intra-subnet traffic in one subnet may potentially be used in another subnet by another traffic stream. In this way, the overall capacity of the network may be increased, while maintaining flexible channel spacing within individual subnets.

Signal information such as wavelengths, power and quality parameters may be monitored in ADNs 12 and/or by a centralized control system. Thus, ADNs 12 may provide for circuit protection in the event of a line cut or other interruption in one or both of the rings 16 and 18. An optical supervisory channel (OSC) may be used by the nodes to communicate with each other and with the control system. In particular embodiments, as described further below with reference to FIGS. 5 through 7, network 10 may be an Optical Unidirectional Path-Switched Ring (OUPSR) network in which traffic sent from a first ADN 12 to a second ADN 12 is communicated from the first ADN 12 to the second ADN 12 over both rings 16 and 18. The second ADN 12 may include components allowing the second node to select between the traffic arriving via rings 16 and 18 so as to forward to a local client(s) the traffic from the ring that has a lower bit error rate (BER), a higher power level, and/or any other appropriate and desirable characteristics. Alternatively, such components may select traffic from a designated ring unless that traffic falls below/above a selected level of one or more operating characteristics (in which case, traffic from the other ring may be selected). The use of such dual signals allows traffic to get from the first ADN 12 to the second ADN 12 over at least one of the rings 16 and 18 in the event of a line break or other damage to the other of the rings 16 and 18.

In other embodiments, network may be an Optical Shared Path Protection Ring (OSPPR) network in which one of rings 16 and 18 may be used as a back-up communication or protection path in the event that a communications on the other ring 16 or 18 are interrupted. When not being used in such a back-up capacity, the protection path may communicate other preemptable traffic, thus increasing the capacity of network 10 in such embodiments. Such an OSPPR protection scheme is described in further detail below in association with FIGS. 8-10.

The wavelength assignment algorithm may maximize wavelength reuse and/or assign wavelengths heuristically. For example, heuristic assignment may assign all intra-subnet (ingress and egress nodes in the same subnet) lightpaths the lowest available wavelength. On the other hand inter-subnet lightpaths (whose ingress and egress nodes are on different subnets or different rings for that matter) may be assigned on the highest possible wavelengths. This may provide static load balancing and may reduce the number of net transponder card type required in the ring.

In one embodiment, each subnet is assigned to make good use of wavelength resources and has a wavelength channel capacity substantially equal to the optical network. Substantially equal in this context in one embodiment may mean the subnet has eighty percent of its wavelengths isolated from the other subnets and available for intra-subnet traffic. In other embodiments, substantially equal may mean ninety percent another suitable percentage.

The network may be divided into subnets based on bandwidth usage per node. For example, a network may have a particular number of nodes, a maximum capacity (in terms of bandwidth) of the network, and a typical capacity per node. Bandwidth is distributed to each node, and the first subnet is built when either the total bandwidth is exhausted completely or when the subnet bandwidth is such that addition of the next node would create an excess bandwidth issue. This process is repeated until each node is placed in a possible subnet.

Figure 2A:
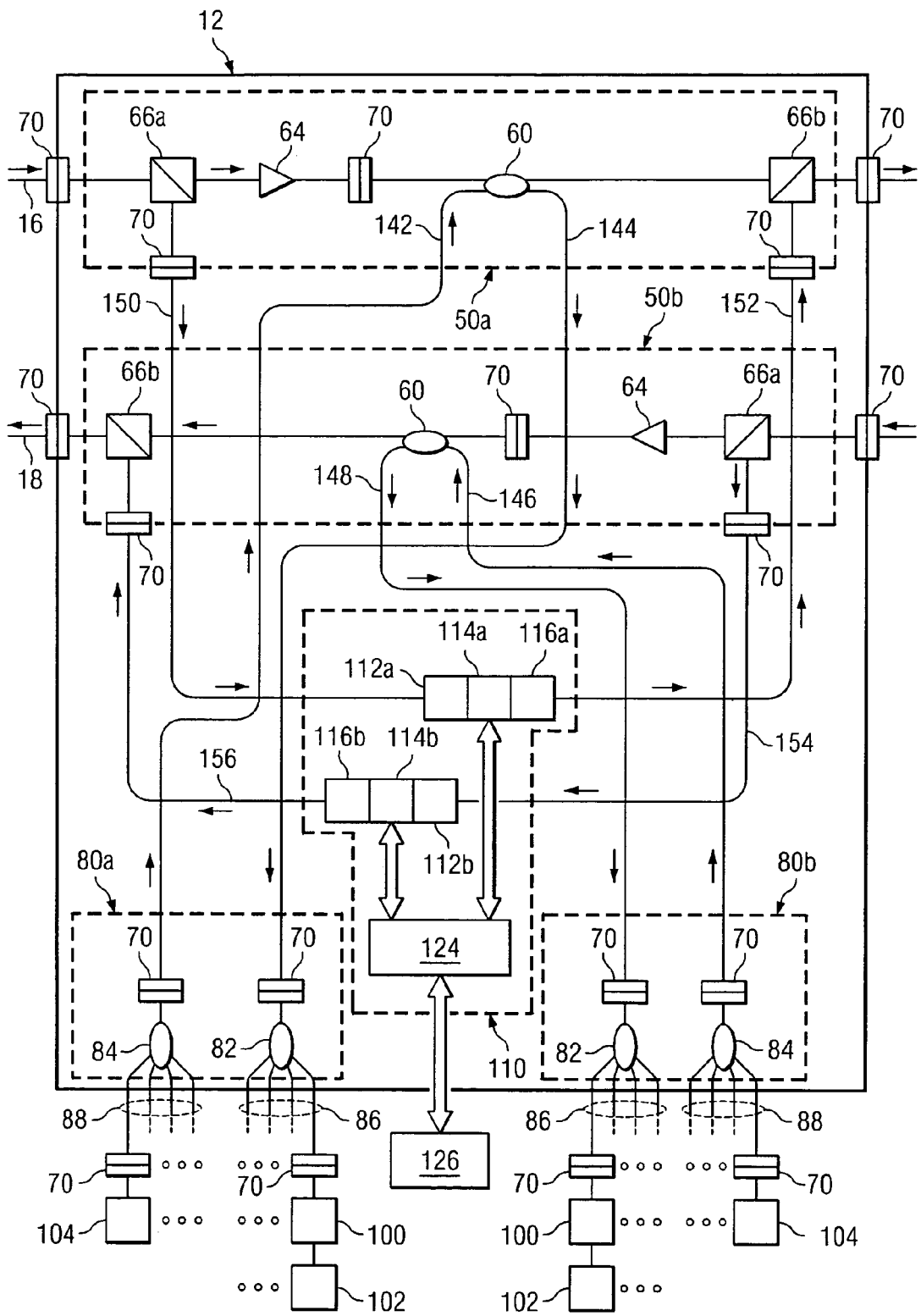
FIG. 2A is a block diagram illustrating details of an example add/drop node of the network of FIG. 1, in accordance with one embodiment of the present invention.

FIG. 2A is a block diagram illustrating details of an ADN 12 of FIG. 1 in accordance with one embodiment of the present invention. Referring to FIG. 2, the ADN 12 comprises counterclockwise transport element 50a, clockwise transport element 50b, counterclockwise distributing/combining element 80a, clockwise distributing/combining element 80b, and managing element 110. In one embodiment, elements 50, 80, and 110, as well as components within the elements, may be interconnected with optical fiber links. In other embodiments, the components may be implemented in part or otherwise with planar waveguide circuits and/or free space optics. Any other suitable connections may alternatively be used. In addition, the elements of ADN 12 may each be implemented as one or more discrete cards within a card shelf of the ADN 12. Exemplary connectors 70 for a card shelf embodiment are illustrated by FIG. 2A. The connectors 70 may allow efficient and cost effective replacement of failed components. It will be understood that additional, different and/or other connectors may be provided as part of the ADN 12.

Transport elements 50 are positioned "in-line" on rings 16 and 18. Transport elements 50 may comprise either a single add/drop coupler 60 or a plurality of add/drop couplers 60 which allow for the passive adding and dropping of traffic. In the illustrated embodiment, transport elements 50 each include a single add/drop coupler 60. Alternatively, a separate drop coupler and add coupler can be so that if one of the couplers fail, the other coupler can still add or drop. Although couplers 60 are described, any other suitable optical splitters may be used. For the purposes of this description and the following claims, the terms "coupler," "splitter," and "combiner" should each be understood to include any device which receives one or more input optical signals, and either splits or combines the input optical signal(s) into one or more output optical signals. The transport elements 50 further comprise OSC filters 66 at the ingress and egress edges of each element, and an amplifier 64 between the ingress OSC filter 66a and the egress OSC filter 66b. Amplifiers 64 may comprise an erbium-doped fiber amplifier (EDFA) or other suitable amplifier. OSC filters 66 may comprise thin film type, fiber grating or other suitable type filters.

Distributing/combining elements 80 may each comprise a drop signal splitter 82 and an add signal combiner 84. Splitters 82 may comprise a coupler with one optical fiber ingress lead and a plurality of optical fiber egress leads which serve as drop leads 86. The drop leads 86 may be connected to one or more filters 100 which in turn may be connected to one or more drop optical receivers 102. In particular embodiments in which four drop leads 86 are implemented, splitters 82 may each comprise a 2×4 optical coupler, where one ingress lead is terminated, the other ingress lead is coupled to a coupler 60 via a fiber segment, and the four egress leads are used as the drop leads 86. Although the illustrated embodiment shows four drop leads 86, it should be understood that any appropriate number of drop leads 86 may implemented, as described in further detail below.

Combiners 84 similarly may comprise a coupler with multiple optical fiber ingress leads, which serve as add leads 88, and one optical fiber egress lead. The add leads 88 may be connected to one or more add optical transmitters 104. In particular embodiments in which four add leads 88 are implemented, combiners 84 may each comprise a 2×4 optical coupler, where one ingress lead is terminated, the other ingress lead is coupled to a coupler via a fiber segment, and the four egress leads are used as the add leads 88. Although the illustrated embodiment shows four add leads 88, it should be understood that any appropriate number of add leads 88 may implemented, as described in further detail below. The ADN 12 further comprises counterclockwise add fiber segment 142, counterclockwise drop fiber segment 144, clockwise add fiber segment 146, clockwise drop fiber segment 148, which connect the couplers 60 to splitters 82 and combiners 84.

Managing element 110 may comprise OSC receivers 112, OSC interfaces 114, OSC transmitters 116, and an element management system (EMS) 124. ADN 12 also comprises OSC fiber segments 150, 152, 154, and 156, that connect managing element 110 to ingress and egress OSC filters 66. Each OSC receiver 112, OSC interface 114, and OSC transmitter 116 set forms an OSC unit for one of the rings 16 or 18 in the ADN 12. The OSC units receive and transmit OSC signals for the EMS 124. The EMS 124 may be communicably coupled to a network management system (NMS) 126. NMS 126 may reside within ADN 12, in a different node, or external to all of the ADNs 12.

EMS 124 and/or NMS 126 may comprise logic encoded in media for performing network and/or node monitoring, failure detection, protection switching and loop back or localized testing functionality of the network 10. Logic may comprise software encoded in a disk or other computer-readable medium and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 12a and/or 14, and the NMS 126 may thus be omitted as a separate, discrete element. Similarly, the OSC units may communicate directly with NMS 126 and EMS 124 omitted.

In operation, the transport elements 50 are operable to passively add traffic to rings 16 and 18 and to passively drop traffic from rings 16 and 18. The transport elements 50 are further operable to passively add and drop the OSC signal to and from rings 16 and 18. More specifically, each OSC ingress filter 66a processes an ingress optical signal from its respective ring 16 or 18. OSC filters 66a filters the OSC signal from the optical signal and forwards the OSC signal to its respective OSC receiver 112. Each OSC filter 66a also forwards or lets pass the remaining transport optical signal to the associated amplifier 64. Amplifier 64 amplifies the signal and forwards the signal to its associated coupler 60.

Each coupler 60 passively splits the signal from the amplifier 64 into two generally identical signals: a through signal that is forwarded to egress OSC filter 66b (after being combined with add traffic, as described below), and a drop signal that is forwarded to the associated distributing/combining element 80. The split signals are copies in that they are identical or substantially identical in content, although power and/or energy levels may differ. Each coupler 60 passively combines the through signal with an add signal comprising add traffic from the associated distributing/combining element 80. The combined signal is forwarded from the coupler 60 to its associated OSC egress filter 66b. Couplers 60 work for both adding and dropping, so they are very low-loss and simple. If a failure occurs in a coupler 60, the replacement of the coupler affects both adding and dropping. To avoid this, a drop coupler and an add coupler can be cascaded instead of using a single coupler 60.

Each OSC egress filter 66b adds an OSC signal from the associated OSC transmitter 116 to the combined optical signal and forwards the new combined signal as an egress transport signal to the associated ring 16 or 18 of network 10. The added OSC signal may be locally generated data or may be received OSC data forwarded through by the EMS 124.

Prior to being forwarded to couplers 60, locally-derived add traffic (from local clients or subscribers, from another network, or from any other appropriate source) is received at a distributing/combining element 80 from one or more of the optical transmitters 104. One or more of the optical transmitters 104 may include one or more components for adjusting the optical output power from the transmitter 104, such as a manual variable optical attenuator. Traffic to be added to ring 18 is received at distributing/combining element 80a and traffic to be added to ring 16 is received at distributing/combining element 80b. These received signals are able to be used as monitors. A separate optical transmitter 104 may be used for each wavelength/channel in which traffic is to be added at an ADN 12. Furthermore, each add lead 88 may be associated with a different wavelength/channel. Therefore, there may be a transmitter 104 and add lead 88 combination for each separate channel in which traffic is desired to be added at a particular ADN 12. Although four add leads 88 for each ring 16 and 18 are illustrated (although four transmitters 104 are not explicitly illustrated), it will be understood that any appropriate number of optical transmitters 104 and associated add leads 88 may be used.

Add traffic from one or more transmitters 104 associated with a particular distributing/combining element 80 is received at the associated combiner 84. The combiner 84 combines the signals from multiple transmitters 104 (if applicable) and forwards the combined add signal to the associated coupler 60 for addition to the associated ring 16 or 18. As described above, this add traffic is then combined with forwarded traffic at coupler 60. Combiner 84 may be a coupler, a multiplexer, or any other suitable device.

In the illustrated embodiment, a separate optical transmitters 104 are described as being associated with each distributing/combining element 80. In such an embodiment, different signals may be communicated over each ring 16 and 18. For example, a first signal can be added in a particular channel/wavelength on ring 16 at an ADN 12, and an entirely different signal can be added in the same channel/wavelength on ring 18 by the same ADN 12. This is possible since each channel/wavelength has an associated optical transmitter 104 at each distributing/combining element 80. As described below, such a feature is useful when providing an OSPPR network, among other reasons.

However, as described in further detail below, when providing an OUPSR network, the same traffic is typically added from an ADN 12 on both ring 16 and ring 18. This duplicate traffic is used to provide fault protection. In such embodiments, two different sets of optical transmitters 104 are not required. Instead, distributing/combining elements 80a and 80b can share a set of transmitters 104. In such a case, the add signals generated by a particular optical transmitter 104 (add signals in a particular channel/wavelength) may be communicated to the combiner 84 of both distributing/combining element 80a and distributing/combining element 80b. Thus, the same traffic is added to rings 16 and 18 by the ADN 12.

As described above, locally-destined traffic on a ring 16 or 18 is dropped to the associated distributing/combining element 80 using coupler 60. The drop traffic is received at the splitter 82 of the distributing/combining element 80, and the splitter 82 splits the dropped signal into multiple generally identical signals and forwards each signal to an optical receiver 102 via a drop lead 86. In particular embodiments, the signal received by optical receivers 102 may first be filtered by an associated filter 100. Filters 100 may be implemented such that each filter allows a different channel to be forwarded to its associated receiver 102. Filters 100 may be tunable filters (such as an acousto-optic tunable filter) or other suitable filters, and receivers 102 may be broadband receivers or other suitable receivers. Such a configuration allows each receiver 102 associated with a particular ring 16 or 18 to receive a different wavelength, and to forward the information transmitted in that wavelength to appropriate clients. A dropped optical signal passing through a filter 100 is able to be optically forwarded to a client without signal regeneration if the signal does not require such regeneration.

As mentioned above, ADN 12 also provides an element management system. EMS 124 monitors and/or controls all elements in the ADN 12. In particular, EMS 124 receives an OSC signal from each ring 16 and 18 in an electrical format via an OSC receiver 112 associated with that ring (the OSC receiver 112 obtains the signal via an OSC filter 66a). EMS 124 may process the signal, forward the signal and/or loopback the signal. Thus, for example, the EMS 124 is operable to receive the electrical signal and resend the OSC signal via OSC transmitter 116 and OSC filter 66b to the next node on the ring 16 or 18, adding, if appropriate, node-specific error information or other suitable information to the OSC.

In one embodiment, each element in an ADN 12 monitors itself and generates an alarm signal to the EMS 124 when a failure or other problem occurs. For example, EMS 124 in ADN 12 may receive one or more of various kinds of alarms from the elements and components in the ADN 12: an amplifier loss-of-light (LOL) alarm, an amplifier equipment alarm, an optical receiver equipment alarm, optical transmitter equipment alarm, or other alarms. Some failures may produce multiple alarms. For example, a fiber cut may produce amplifier LOL alarms at adjacent nodes and also error alarms from the optical receivers. In addition, the EMS 124 may monitor the wavelength and/or power of the optical signal within the ADN 12 using an optical spectrum analyzer (OSA) communicably connected to appropriate fiber segments within ADN 12 and to EMS 124.

The NMS 126 collects error information from all of the nodes 12 and 14 and is operable to analyze the alarms and determine the type and/or location of a failure. Based on the failure type and/or location, the NMS 126 determines needed protection switching actions for the network 10. The protection switch actions may be carried out by NMS 126 by issuing instructions to the EMS in the nodes 12 and 14.

Error messages may indicate equipment failures that may be rectified by replacing the failed equipment. For example, a failure of an optical receiver or transmitter may trigger an optical receiver equipment alarm or an optical transmitter equipment alarm, respectively, and the optical receiver or transmitter replaced as necessary.

Although a passive ADN 12 has been described, in particular embodiments network 10 may include active nodes, passive nodes, or a combination of active and passive nodes. Nodes may be passive in that they include no optical switches, switchable amplifiers, or other active devices. Nodes may be active in that they include optical switches, switchable amplifiers, or other active devices in the transport elements or otherwise in the node. Passive nodes may be of a simpler and less expensive design.

Figure 2B:
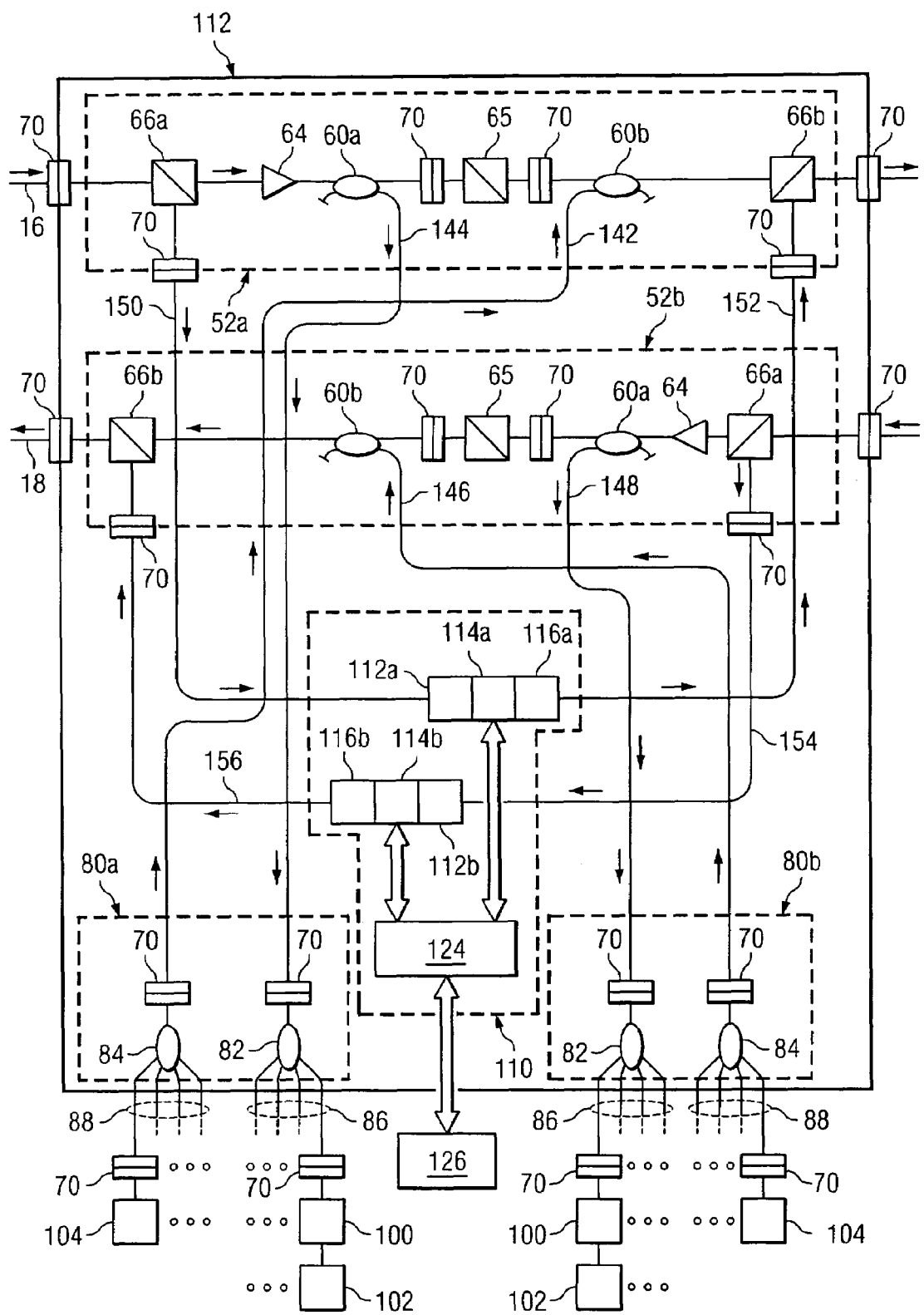
FIG. 2B is a block diagram illustrating an alternative embodiment of the add/drop node of FIG. 2A, in accordance with one embodiment of the present invention.

FIG. 2B is a block diagram illustrating details of ADN 112, an alternative configuration of ADN 12 of FIG. 1, in accordance with another embodiment of the present invention. ADN 112 illustrated in FIG. 2B is substantially similar to ADN 12 illustrated in FIG. 2B, except that ADN 112 of FIG. 2B comprises a counterclockwise transport element 52a and clockwise transport element 52b, which each include a sub-band rejection filter 65. Sub-band rejection filter 65 blocks a particular sub-band of optical traffic from passing through transport elements 52. A sub-band is a portion of the bandwidth of the network. Each sub-band may carry none, one, or a plurality of traffic channels. The traffic channels may be flexibly spaced within the sub-band. Traffic contained in un-rejected sub-bands is passed through to other components of the network. Such passed-through traffic may be rejected at another node in the network. The rejection of a particular sub-band by rejection filter 65 enables traffic in that sub-band to be added and dropped at ADN 112 without interference with traffic in the sub-band being communicated on the network.

Figure 3:
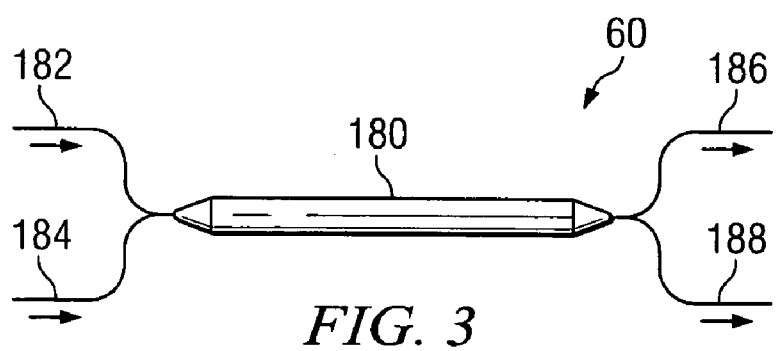
FIG. 3 is a block diagram illustrating details of an optical coupler of the add/drop nodes of FIGS. 2A-2B, in accordance with one embodiment of the present invention.

FIG. 3 is a block diagram illustrating details of an optical coupler 60 of ADN 12 of FIG. 2A or ADN 112 of FIG. 2B, in accordance with one embodiment of the present invention. Hereinafter, references to ADN 12 are applicable to both ADN 12 and ADN 112. In this embodiment, the optical coupler 60 is a fiber coupler with two inputs and two outputs. The optical coupler 60 may, in other embodiments, be combined in whole or part with a waveguide circuit and/or free space optics. It will be understood that the coupler 60 may include one or any number of any suitable inputs and outputs, and that the coupler 60 may comprise a greater number of inputs than outputs or a greater number of outputs than inputs.

Referring to FIG. 3, the optical coupler 60 comprises a main body 180, a first ingress segment 182, second ingress segment 184, first egress segment 186, and second egress segment 188. First ingress segment 182 and first egress segment 186 comprise a first continuous optical fiber. Second ingress segment 184 and second egress segment 188 comprise a second continuous optical fiber. Outside of the main body 180, segments 182, 184, 186, and 188 may comprise a jacket, a cladding, and a core fiber. Inside the main body 180, the jacket and cladding may be removed and the core fibers twisted or otherwise coupled together to allow the transfer of optical signals and/or energy of the signals between and among the first and second continuous optical fibers. In this way, the optical splitter/coupler 60 passively combines optical signals arriving from ingress segments 182 and 184 and passively splits and forwards the combined signal via egress segments 186 and 188. A plurality of signals may be combined and the combined signal split by combining and thereafter splitting the combined signal or by simultaneously combining and splitting the signals by transferring energy between fibers. In this manner, the optical splitter/coupler 60 provides flexible channel-spacing with no restrictions concerning channel-spacing in the main streamline. In a particular embodiment, the coupler has a directivity of over −55 dB. Wavelength dependence on the insertion loss is less than about 0.5 dB over a 100 nm range. The insertion loss for a 50/50 coupler is less than about −3.5 dB.

Figure 4A:
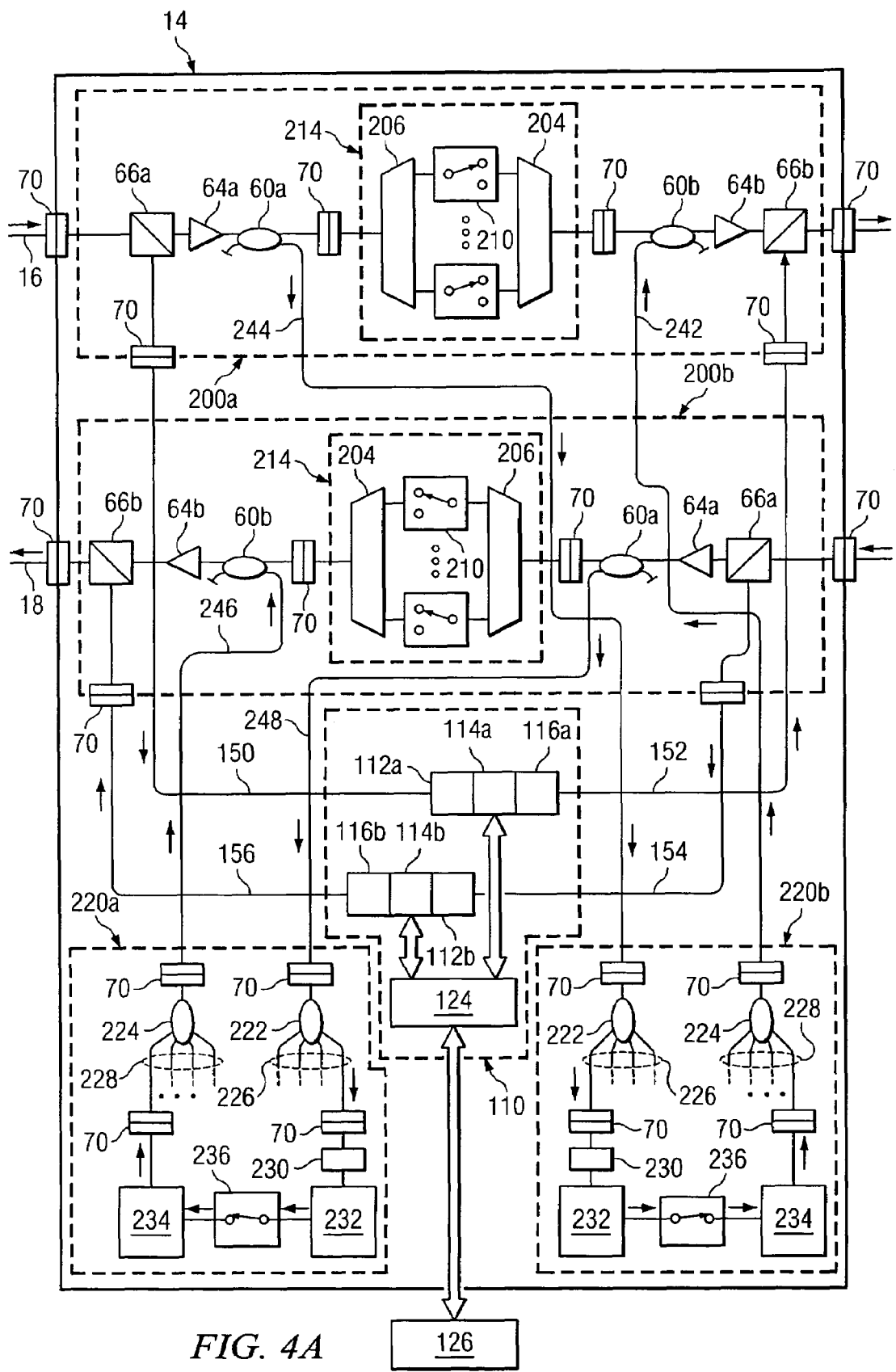
FIG. 4A is a block diagram illustrating details an optical gateway of the network of FIG. 1, in accordance with one embodiment of the present invention.

FIG. 4A is a block diagram illustrating details an optical gateway 14 of the network of FIG. 1 in accordance with one embodiment of the present invention. As previously described, a gateway 14 may be disposed between, and may form the boundary of, neighboring subnets. A gateway 14 may be any suitable node, nodes or element of one or more nodes that is configurable to selectively isolate or expose channels (or groups of channels) between nodes in one or more directions of a ring or other suitable network configuration. In particular embodiments, for the signal in each such channel (or group of channels), gateway 14 may pass through the signal unchanged, regenerate the signal, or regenerate and convert the wavelength of the signal.

Referring to FIG. 4A, gateway 14 includes a counterclockwise transport element 200a and a clockwise transport element 200b. Transport elements 200 each comprise a multiplexer/demultiplexer (mux/demux) unit 214. Mux/demux units 214 may each comprise a demultiplexer 206, a multiplexer 204, and switch elements which may comprise an array of switches 210 or other components operable to selectively forward or terminate a traffic channel (or group of channels). In a particular embodiment, multiplexers 204 and demultiplexers 206 may comprise arrayed waveguides. In another embodiment, the multiplexers 204 and the demultiplexers 206 may comprise fiber Bragg gratings, thin-film-based sub-band (a group of wavelengths/channels which are a sub-set of the total wavelengths/channels available) multiplexers/demultiplexers, or any other suitable devices. If a mux/demux unit 214 consists of sub-band mux/demux, the unit 214 is operable to block or forward sub-bands. The switches 210 may comprise 1×2 or other suitable switches, optical cross-connects, or other suitable components operable to selectively forward or terminate the demultiplexed traffic channels. Mux/demux units 214 may alternatively comprise any other components that are collectively operable to selectively block or forward individual channels or groups of channels.

Similarly to ADNs 12, gateway transport elements 200 also couplers 60, amplifiers 64, OSC filters 66, and connectors 70. In the illustrated embodiment, a coupler 60a is positioned prior to each mux/demux unit 214 and a coupler 60b is positioned after each mux/demux unit 214. Coupler 60a passively splits the signal from a pre-amplifier 64a into two generally identical signals: an through signal that is forwarded to mux/demux unit 214, and a drop signal that is forwarded to an associated signal regeneration element 220. The split signals may be substantially identical in content, although power levels may differ. Coupler 60b passively combines a signal from mux/demux unit 214 with a signal from the respective signal regeneration element 220. The combined signal is forwarded from the coupler 60b to a post-amplifier 64b.

The transport elements 200 are further operable to passively add and drop an OSC signal to and from rings 16 and 18, as with transport elements 50 of ADNs 12. More specifically, each transport element 200 includes an OSC ingress filter 66a that processes an ingress optical signal from its respective ring 16 or 18. Each OSC filter 66a filters the OSC signal from the optical signal and forward the OSC signal to a respective OSC receiver 112. Each OSC filter 66a also forwards or lets pass the remaining transport optical signal to the associated pre-amplifier 64a. Pre-amplifier 64a amplifies the signal and forwards the signal to its associated coupler 60a.

Transport elements 200 also each include an OSC egress filter 66b that adds an OSC signal from an associated OSC transmitter 116 to the optical signal from post-amp 64b and forwards the combined signal as an egress transport signal to the associated ring 16 or 18 of network 10. The added OSC signal may be locally generated data or may be received OSC data passed through by the local EMS 124.

Signal regeneration elements 220 each include a splitter 222 and a combiner 224. As with splitters 82 of ADNs 12, splitters 222 may comprise a coupler with one optical fiber ingress lead and a plurality of optical fiber egress leads which serve as drop leads 226. One or more of the drop leads 226 may each be connected to a filter 230, which in turn may be connected to an optical transponder 232. Combiners 224 similarly may comprise a coupler with one optical fiber egress lead and a plurality of optical fiber ingress leads which serve as add leads 228. One or more of the add leads 228 may each be connected to an optical transponder 234. One or more of the optical transponders 234 may include one or more components for adjusting the optical output power from the transponder 234, such as a manual variable optical attenuator. Transponders 232 and 234 may be coupled though a switch 236 that may either forward a signal transmitted from transponder 232 to transponder 234, or terminate the signal.

Although the illustrated embodiment shows four drop leads 226 and four add leads 228, it should be understood that any appropriate number of drop leads 226 and add leads 228 may be implemented, as described in further detail below. Gateway 14 further comprises counterclockwise add fiber segment 242, counterclockwise drop fiber segment 244, clockwise add fiber segment 246, and clockwise drop fiber segment 248, which connect the couplers 60a and 60b to splitters 222 and combiners 224.

Similar to ADNs 12, gateway 14 comprises a management element 110 comprising OSC receivers 112, OSC interfaces 114, OSC transmitters 116, and an EMS 124 (which is coupled to NMS 126), as described above with reference to FIG. 2. The EMS 110 is connected to transport elements 200 via OSC fiber segments 150, 152, 154, and 156, again as described in reference to FIG. 2.

In operation, each transport element 200 receives a optical signal, comprising a plurality of channels, from its respective ring 16 or 18. OSC filter 66a filters the OSC signal from the optical signal as described above and the remaining optical signal is forwarded to amplifier 64a, which amplifies the signal and forwards it to coupler 60a. Coupler 60a passively splits the signal from the amplifier 64 into two generally identical signals: an through signal that is forwarded to mux/demux unit 214, and a drop signal that is forwarded to the associated signal regeneration element 220. The split signals may be substantially identical in content, although power levels may differ.

Demultiplexer 206 of mux/demux unit 214 receives the optical signal from coupler 60a and demultiplexes the signal into its constituent channels. Switches 210 selectively terminate or forward each channel to multiplexer 204. As described below, channels may be selectively terminated or forwarded to implement subnets and associated protection schemes. The channels that are forwarded by switches 210 are received by multiplexer 204, which multiplexes the received channels into a WDM optical signal and forwards the optical signal to coupler 60b.

Splitter 222 of signal regeneration element 220 also receives the optical signal from coupler 60a. Splitter 222 splits the dropped signal into multiple generally identical signals. One or more of the these signals are each forwarded to an optical filter 230 via a drop lead 236. Each drop lead 236 may have an associated filter 230 which allows only a particular wavelength/channel (or group of wavelengths/channels) to forward. Filters 230 may be implemented such that each filter allows a different channel (a filtered channel) to forward to an associated transponder 232. Such a configuration allows each transponder 232 that is associated with a particular signal regeneration element 220 to receive a different wavelength. This, in turn, allows selected wavelengths to be forwarded to a transponder 232, and allows each such filtered wavelength to be dealt with differently, if appropriate.

Transponders 232 each include a receiver that receives an optical signal and converts the optical signal into an electrical signal. Each transponder also includes a transmitter that may convert the electrical signal back into an optical signal. Such an optical-electrical-optical conversion of an optical signal regenerates the signal. Alternatively, transponders 232 and 234 may be replaced by a single receiver and a single transmitter, respectively, where a received signal is electrically communicated from the receiver to the transmitter. Regeneration may be needed or desired when an optical signal must travel a relatively long distance from origin node to destination node. Since the power of the signal decreases as it travels over ring 16 or 18, signal regeneration is needed if the distance of travel is great enough to degrade a signal to the point that it is unusable or undesirable. As an example only, in a typical metropolitan network, signal regeneration may be desired after a signal has traveled approximately one hundred kilometers.

In the illustrated embodiment, the regenerated optical signal is forwarded from transponder 232 to a switch 236 that is located between each transponder 232 and an associated transponder 234. Switch 236 may selectively terminate the optical signal coming from the associated transponder 232 or it may forward the signal to the associated transponder 234. Transponders 234 may include a receiver and a transmitter, and signals forwarded to a transponder 234 go through an optical-electrical-optical conversion, as with transponders 232. In particular embodiments, transponders 234 include a transmitter that may change the wavelength/channel in which a signal is transmitted. Particular uses of such wavelength conversion are described in further detail below.

Although transponder "sets" (transponder 232 and transponder 234) are illustrated, some embodiments may replace each such set with a single transponder. Such a single transponder may perform both signal regeneration and wavelength conversion. Furthermore, if a single transponder is used, switch 236 may be positioned between the receiver and transmitter of the transponder, or no switch may be used. Furthermore, any number of drop leads 226 and add leads 228 and associated transponders 232 and 234 may be used. The number of such leads and transponder sets (or single transponders) may vary depending on the number of wavelengths/channels of the optical signals being communicated over rings 16 and 18 on which regeneration or wavelength conversion are to be performed.

After performing regeneration and/or wavelength conversion on selected wavelengths/channels, such wavelengths/channels are communicated from the transponders 234 of a particular signal regeneration element 220 via add leads 228 to the combiner 224 of that signal regeneration element 220. Combiner 224 combines different wavelengths/channels from transponders 234 and forwards the combined optical signal to coupler 60b of the associated transport element 200.

Coupler 60b passively combines the optical signal from the associated mux/demux unit 214 with the optical signal from the associated signal regeneration element 220. The combined signal is forwarded from the coupler 60b to the associated post-amplifier 64b, where the combined optical signal is amplified. The amplified optical signal is then forwarded to OSC egress filter 66b, which adds an OSC signal from the associated OSC transmitter 116 to the combined optical signal and forwards the new combined signal as an egress transport signal to the associated ring 16 or 18 of network 10. The added OSC signal may be locally generated data or may be received OSC data forwarded through by the EMS 124.

The combination of couplers 60a and 60b, mux/demux unit 214, and signal regeneration element 220 in gateway 14 for each ring 16 and 18 provide for flexible treatment of optical traffic arriving at gateway 14 on rings 16 and 18. For example, particular wavelengths/channels of the traffic may be forwarded through mux/demux unit 214, such that no regeneration or wavelength conversion occurs. These same wavelengths will typically be filtered out of the optical signals dropped to signal regeneration elements 220 from couplers 60a. Other wavelengths are each allowed to forward through one of the filters 230 of a signal regeneration element 220 and may thus be regenerated and/or be converted to another wavelength. These wavelengths that are forwarded to a transponder 232 are typically terminated by an associated switch 210 of mux/demux unit 214. Therefore, each wavelength of an optical signal entering gateway 14 may be: 1) optically passed through, 2) optically terminated (to separate an optical subnet domain from other such domains), 3) regenerated without wavelength conversion, or 4) regenerated with wavelength conversion. EMS 110 may configure mux/demux units 214 and signal regeneration element 220 to perform one of these options on each wavelength to provide for subnets, protection switching, and other suitable features, as described in greater detail below.

In accordance with various other embodiments, gateways 14 may be further provisioned to passively add and drop traffic to optical rings 16 and 18. Two such example embodiments are described below.

Figure 4B:
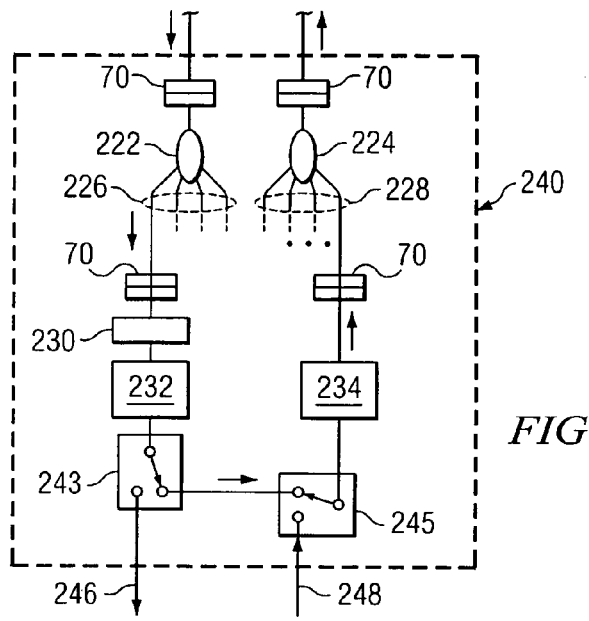
FIG. 4B is a block diagram illustrating a regeneration element that may be implemented in the gateway of FIG. 4A.

FIG. 4B is a block diagram illustrating a regeneration element 240 which may be implemented in gateway 14 of FIG. 4A in place of each regeneration element 220 to allow traffic to be added and dropped to local clients or other destinations using gateway 14. Regeneration element 240 is similar to regeneration elements 220, except that switch 236 is replace by switches 243 and 245. Switch 243 is operable to communicate an optical signal from transponder 232 to either switch 245 or to a local client or other destination, such as another optical network (a situation described with reference to FIGS. 12-13), coupled to switch 243 for receiving dropped optical traffic (the drop traffic illustrated by arrow 246). Switch 245 may be operated to either receive optical signals from switch 243 or from a destination that is adding optical traffic (the add traffic illustrated by arrow 248). Therefore, a signal from transponder 232 may either be dropped to an appropriate destination or it may communicated to transponder 234 (for example, for wavelength conversion and communication back to ring 16 or 18). In this way, gateway 14 can be configured, for each wavelength received by a transponder 232, to either regenerate (and possibly wavelength convert) the signal in that wavelength or to drop the signal in that wavelength to an appropriate destination. In other embodiments, a dropped optical signal may be optically forwarded to a local client without being regenerated (the signal can be forwarded directly from filter 230 to the client without being forwarded through transponder 232.

Figure 4C:
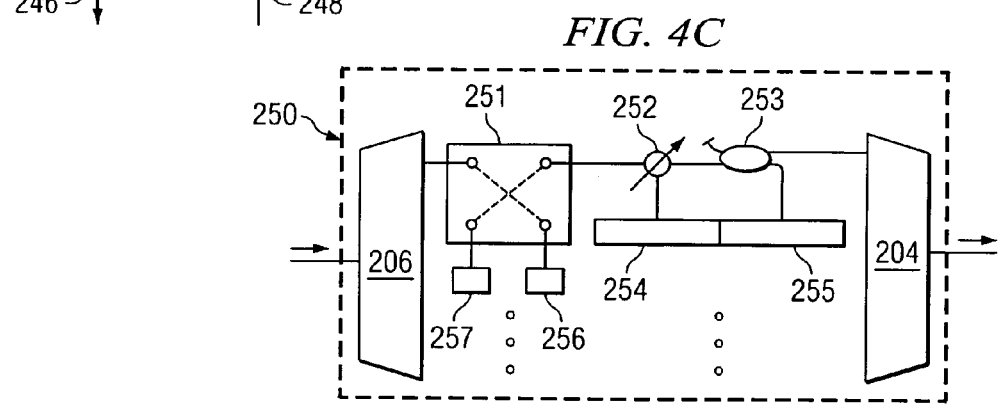
FIG. 4C is a block diagram illustrating a multiplexer/demultiplexer unit that may be implemented in the gateway of FIG. 4A.

FIG. 4C is a block diagram illustrating a mux/demux unit 250 which may be implemented in gateway 14 of FIG. 4A in place of each mux/demux unit 214 to allow traffic to be added and dropped to local clients using gateway 14. Mux/demux unit 250 comprises demultiplexer 206 and multiplexer 204, as described above in reference to FIG. 4A. In place of the plurality of switches 210 are a plurality of 2×2 switch/attenuator sets each comprising 2×2 switch 251, a variable optical attenuator (VOA) 252, an optical splitter 253, a photodetector 255, and a controller 254. VOA 252 attenuates the ingress signal to a specified power level based on a feedback loop including splitter 253 that taps the signal, photodetector 255 that detects the power level of the signal, and feedback controller 254 that controls VOA 254 based on the detected power level. In this way, the rings may be opened for a particular wavelength/channel by switching the 2×2 switch to the "cross" position, and the power level of the "through" signal when the 2×2 switch is in the "through" position may be adjusted. Alternatively, traffic in particular wavelengths may be added and/or dropped from the rings 16 and 18 via drop leads 256 and add leads 257 of switches 251. As described above with reference to distributing/combining elements 80, these leads 256 and 257 may be coupled to receivers that receive dropped traffic and transmitters that add traffic. If sub-band mux/demux units are deployed, adding/dropping and power-level control may be performed per subband.

Figure 5:
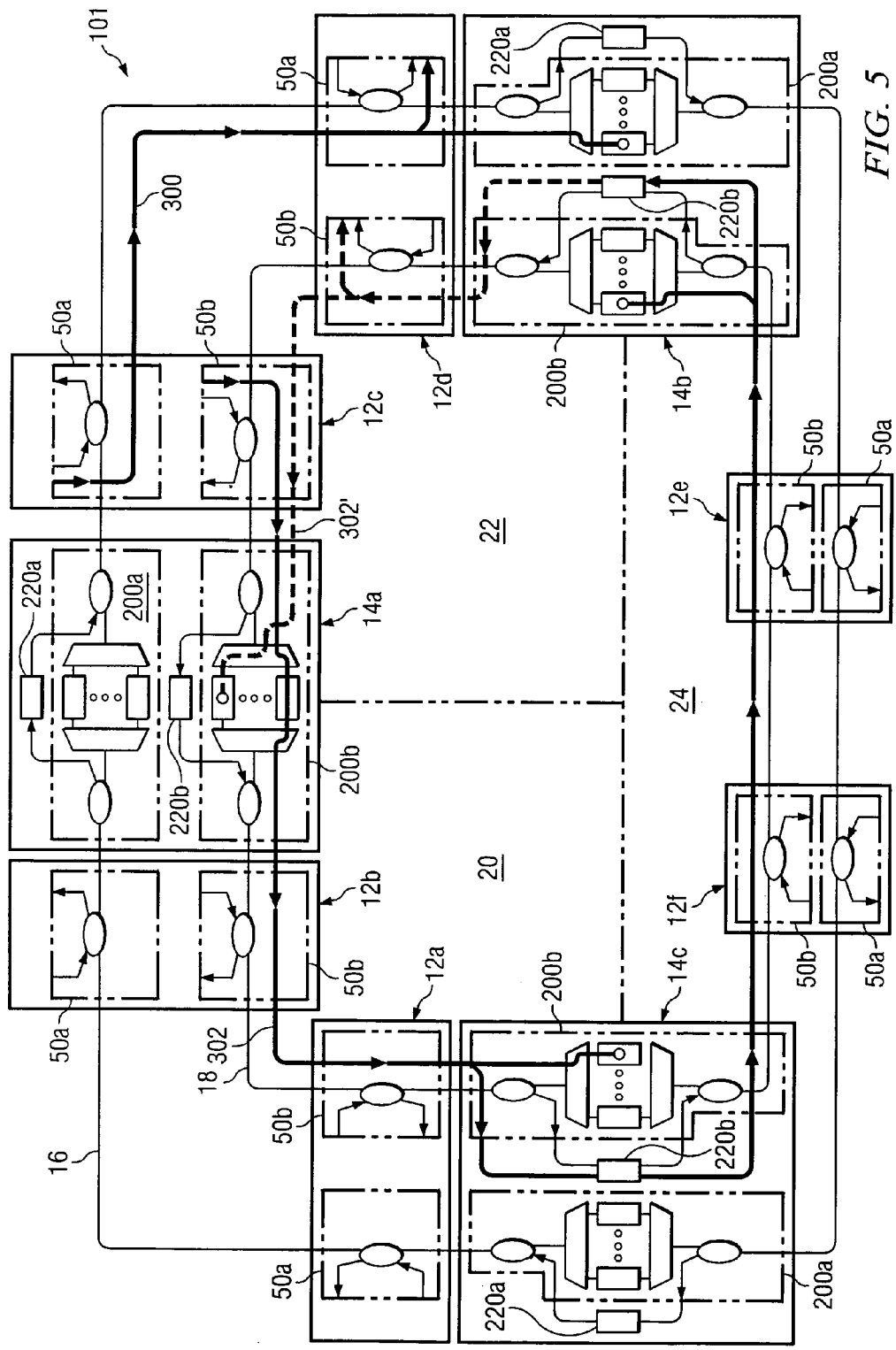
FIG. 5 is a block diagram illustrating example light paths associated with an example configuration of the optical network of FIG. 1, in accordance with one embodiment of the present invention.

FIG. 5 is a block diagram illustrating example optical signals associated with an example configuration of optical network 10 of FIG. 1 in accordance with one embodiment of the present invention. The example optical signal light paths illustrate an implementation of network 10 as an OUPSR network. In FIG. 5, for ease of reference, only high-level details of ADNs 12 and gateways 14 are shown. As described with reference to FIG. 1, the example optical network 10 includes three subnets 20, 22, and 24. Subnet 20 includes ADNs 12a and 12b, subnet 22 includes ADNs 12c and 12d, and subnet 24 includes ADNs 12e and 12f. Gateway 14a divides subnets 20 and 22, gateway 14b divides subnets 22 and 24, and gateway 14c divides subnets 24 and 20. All of these nodes 12 and 14 may have a "drop and continue" function, as described below.

In the illustrated embodiment, three traffic streams are shown. Traffic stream 300 is a clockwise stream originating from ADN 12c and traveling on ring 16 destined for ADN 12d. Traffic stream 302 is a counterclockwise stream originating from ADN 12c and traveling on ring 18 destined for ADN 12d. Traffic stream 302' is traffic stream 302 after having its wavelength converted. Traffic stream 302' includes the same content as stream 302, but in a different wavelength/channel. For OUPSR protection, traffic streams 300 and 302 include identical content destined for ADN 12d. As described below, these dual OUPSR traffic streams may be implemented by configuring gateways 14 to provide selective regeneration and/or wavelength conversion of streams 300 and/or 302 in appropriate circumstances. For example, streams 300 and/or 302 may be regenerated after traveling a particular distance, and stream 302 may be wavelength converted to stream 302' to prevent interference with itself as it travels through the subnet in which it originated. Such selective regeneration and/or wavelength conversion allows for travel of streams 300 and 302 over relatively long distances (if applicable) and prevents interference of signals in network 10.

Traffic stream 300 is originated in a first wavelength/channel, $\lambda_1$, at ADN 12c using a transmitter 104 associated with ring 16. Stream 300 is added to existing optical signals on ring 16 via the coupler 60 of ADN 12c that is associated with ring 16. Although only stream 300 is shown on ring 16, it should be understood that other traffic streams in other wavelengths/channels (or possibly in the same wavelength/channel in other subnets) are also travelling around ring 16. After exiting ADN 12c, stream 300 travels via ring 16 to ADN 12d. The coupler 60 of ADN 12d drops stream 300, along with all other traffic on ring 16. A receiver 102 (with an associated filter 100) may then be used to receive stream 300 and forward the information in that stream to an appropriate location. Stream 300 is also forwarded by coupler 60 of ADN 12d, and travels to gateway 14b.

Coupler 60a of gateway 14b both drops (in other words, forwards a copy to regeneration element 220) and forwards traffic on ring 16 coming from ADN 12d (including stream 300). The forwarded traffic is demultiplexed by demultiplexer 206 of gateway 14b into its constituent wavelengths/channels, including stream 300 in $\lambda_1$. Demultiplexed stream 300 is forwarded from the demultiplexer 206 to its associated switch 210. The switch 210 is configured in the illustrated embodiment to terminate stream 300. Such termination is appropriate since traffic in stream 300 is destined for ADN 12d, which this traffic has already reached. The dropped stream 300 included in the traffic dropped from coupler 60a is similarly terminated by configuring the filters 230 associated with the signal regeneration element 220 of the gateway 14 to not forward $\lambda_1$. Because stream 300 is terminated before entering subnets 24 and 20, $\lambda_1$ may be reused in these subnets for other traffic, if desired.

Traffic stream 302 is originated in a second wavelength/channel, $\lambda_2$, at ADN 12c using a transmitter 104 associated with ring 18. The use of $\lambda_2$ is used as merely an example and for purposes of distinction. In fact, since ring 16 is separate from ring 18, stream 322 may be (and might typically be) transmitted in $\lambda_1$. Furthermore, any other appropriate wavelengths/channels may be used to transmit streams 302, 302, and 302'. Stream 302 is added to existing optical signals on ring 18 via the coupler 60 of ADN 12c that is associated with ring 18. Although only stream 302 (and 302') is shown on ring 18, it should be understood that other traffic streams in other wavelengths/channels (or possibly in the same wavelength/channel in other subnets) are also travelling around ring 18. After exiting ADN 12c, stream 302 travels via ring 18 to gateway 14a.

Coupler 60a of gateway 14a both drops and forwards traffic on ring 18 coming from ADN 12c (including stream 302). The forwarded traffic is demultiplexed by demultiplexer 206 of gateway 14a into its constituent wavelengths/channels, including stream 302 in $\lambda_2$. Demultiplexed stream 302 is forwarded from the demultiplexer 206 to its associated switch 210. The switch 210 is configured in the illustrated embodiment to forward stream 302. Such forwarding is appropriate since traffic in stream 302 is destined for ADN 12d, which this traffic has not yet reached, and since the stream 302 does not need to be regenerated or wavelength converted. It is assumed in the illustrated embodiment that the distance from ADN 12c to gateway 14a is not large enough to require signal regeneration. The forwarded stream 302 is recombined with other demultiplexed traffic using multiplexer 204. The dropped stream 302 included in the traffic dropped from coupler 60a is terminated (since no regeneration or wavelength conversion is needed) by configuring the filters 230 associated with the signal regeneration element 220 of the gateway 14a to not forward $\lambda_2$.

Stream 302 travels, along with other traffic, from gateway 14a through ADNs 12b and 12a to gateway 14c. The traffic stream 302 is not shown as being dropped by ADNs 12b and 12a because stream 302 is not destined for these nodes. However, it should be understood that coupler 60 of ADNs 12b and 12a both forwards stream 302 (along with the rest of the traffic on ring 18) and drops stream 302 (along with the other traffic). The filters 100 associated with ADNs 12b and 12a filter out $\lambda_2$, as described above, since stream 302 is not destined for these nodes. Alternatively, wavelengths may be filtered out by an electrical switch in the receiver 102.

Upon reaching gateway 14c, coupler 60a of gateway 14c both drops and forwards traffic on ring 18 coming from ADN 12a (including stream 302). For the purposes of this example, it is assumed that stream 302 requires regeneration due to the distance it has traveled around ring 18 to this point. Therefore, once the traffic forwarded by coupler 60a is demultiplexed by demultiplexer 206 of gateway 14c, demultiplexed stream 302 in $\lambda_2$ is terminated by a switch 210. Such termination is appropriate since traffic in stream 302 is regenerated using signal regeneration element 220 and added back onto ring 18 at coupler 60b.

The traffic dropped by coupler 60a is forwarded to a signal regeneration element 220 associated with ring 18. The dropped traffic is split into multiple copies by a splitter 222 and stream 302 is forwarded through to a transponder 232 by a filter 230. Stream 302 is then regenerated using transponder 232 and/or transponder 234 (as described above, a single transponder may be used in particular embodiments). No wavelength conversion is performed at this point in the illustrated embodiment. The regenerated stream 302 is then combined with other signals being forwarding through the signal regeneration element 220 by a combiner 224, and the combined signal is added to traffic forwarding though mux/demux unit 214 by coupler 60b. This combined traffic is communicated from gateway 14c to ADN 12f.

Stream 302 travels, along with other traffic, from gateway 14c through ADNs 12f and 12e to gateway 14b. The traffic stream 302 is not shown as being dropped by ADNs 12f and 12e because stream 302 is not destined for these nodes. However, it should be understood that coupler 60 of ADNs 12f and 12e both forwards stream 302 (along with the rest of the traffic on ring 18) and drops stream 302 (along with the other traffic).

The filters 100 associated with ADNs 12f and 12e filter out $\lambda_2$, as described above, since stream 302 is not destined for these nodes.

Upon reaching gateway 14b, coupler 60a of gateway 14b both drops and forwards traffic on ring 18 coming from ADN 12a (including stream 302). For the purposes of this example, stream 302 requires wavelength conversion at this point since travel of stream 302 in $\lambda_2$ in subnet 22 will create interference with traffic originating from ADN 12c in $\lambda_2$. Therefore, once the traffic forwarded by coupler 60a is demultiplexed by demultiplexer 206 of gateway 14b, demultiplexed stream 302 in $\lambda_2$ is terminated by a switch 210.

The traffic dropped by coupler 60a is forwarded to a signal regeneration element 220 associated with ring 18. The dropped traffic is split into multiple copies by a splitter 222 and stream 302 is forwarded through to a transponder 232 by a filter 230 which allows $\lambda_2$ to be forwarded to the transponder 232. Stream 302 is then regenerated using transponder 232 and it wavelength is converted to $\lambda_3$ by transponder 234 (although, as described above, a single transponder may be used in particular embodiments). The regenerated and wavelength converted stream 302' is then combined with other signals being forwarded through the signal regeneration element 220 by a combiner 224, and the combined signal is added to traffic forwarding though mux/demux unit 214 by coupler 60b. This combined traffic is communicated from gateway 14b to ADN 12d.

Coupler 60 of ADN 12d both forwards stream 302' (along with the rest of the traffic on ring 18) and drops stream 302' (along with the other traffic). One of the filters 100 associated with ADN 12d is configured to forward through $\lambda_3$, since stream 302' is destined for ADN 12d. Stream 302' also continues on to ADN 12c, which drops and filters out stream 302'. Coupler 60 of ADN 12c also forwards stream 320', but since stream 302' is now in $\lambda_3$, no interference is caused when stream 302' is combined at coupler 60 with stream 302 originating from ADN 12c in $\lambda_2$. Stream then 302' travels from ADN 12c to gateway 14a.

Coupler 60a of gateway 14a both drops and forwards traffic on ring 18 coming from ADN 12d (including stream 302'). The forwarded traffic is demultiplexed by demultiplexer 206 of gateway 14b into its constituent wavelengths/channels, including stream 302' in $\lambda_3$. Demultiplexed stream 302' is forwarded from the demultiplexer 206 to its associated switch 210. The switch 210 is configured in the illustrated embodiment to terminate stream 302'. Such termination is appropriate since traffic in stream 302' is destined for ADN 12d, which this traffic has already reached. The dropped stream 302' included in the traffic dropped from coupler 60a is similarly terminated by configuring the filters 230 associated with the signal regeneration element 220b of the gateway 14 to not forward $\lambda_3$. Because stream 302' is terminated before entering subnets 20 and 24, $\lambda_3$ may be reused in these subnets for other traffic, if desired.

In this manner, OUSPR protection can be provided in network 10 through the configuration of gateways 14 and ADNs 12. This protection is implemented by providing traffic stream 300 that travels clockwise around ring 16 from its origin to its destination, and traffic streams 302 and 302', including the same information as the first traffic stream 300, that travel counterclockwise around ring 18. Therefore, protection is provided since the information can reach the destination even if there is a break or other error in rings 16 and/or 18. For example, if rings 16 and 18 are broken between ADNs 12c and 12d, traffic stream 300 will not reach ADN 12d. However, traffic stream 302' will reach ADN 12d—thus providing traffic protection. It will be understood that breaks or other errors in other locations of network 10 may be dealt with in a similar fashion. Furthermore, although the example OUPSR network implementation described in FIG. 5 includes three subnets each having two ADNs 12, any appropriate number of ADNs 12, gateways 14, and subnets may be used. Each gateway 14 may still be configured to at least terminate, optically pass-through, regenerate, or regenerate and wavelength convert traffic on each incoming channel depending on the source and destination of that traffic. Moreover, a single gateway 14 may be used as a hub node in a network having no subnets, as described below.

Figure 6:
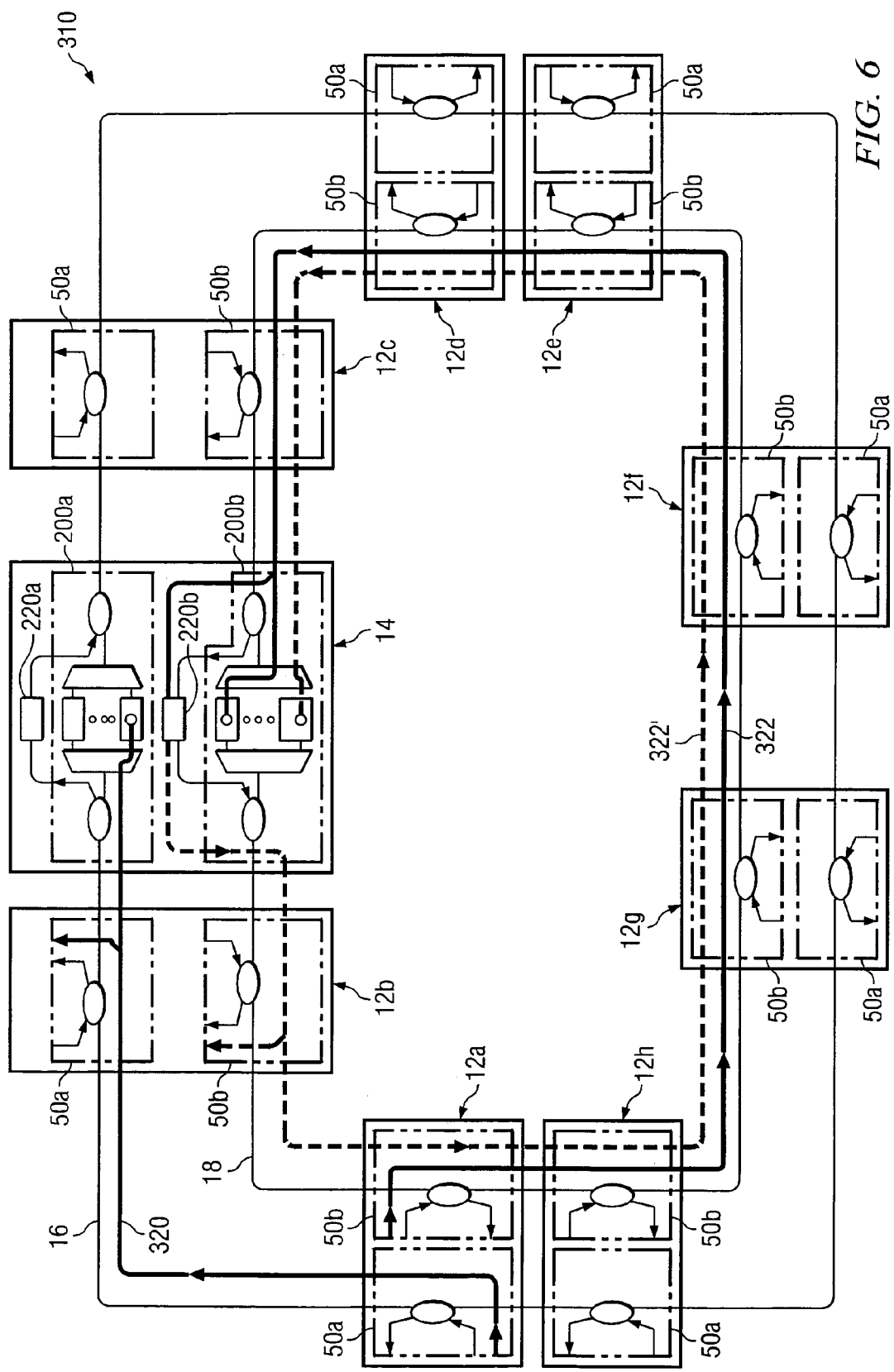
FIG. 6 is a block diagram illustrating example light paths of optical signals in an optical network having a single gateway, in accordance with another embodiment of the present invention.

FIG. 6 is a block diagram illustrating example optical signals in an optical network 310 of FIG. 1 in accordance with one embodiment of the present invention. These example light paths illustrate an implementation of network 310 as an OUPSR network. Network 310 includes a plurality if ADNs 12 and a single gateway 14 acting as a hub node. Therefore, network 310 does not comprise subnets. In FIG. 6, for ease of reference, only high-level details of ADNs 12 and gateways 14 are shown.

In the illustrated embodiment, three traffic streams are shown. Traffic stream 320 is a clockwise stream originating from ADN 12a and traveling on ring 16 destined for ADN 12b. Traffic stream 322 is a counterclockwise stream originating from ADN 12a and traveling on ring 18 destined for ADN 12b. Traffic stream 322' is traffic stream 322 after having its wavelength converted. Traffic stream 322' includes the same content as stream 322, but in a different wavelength/channel. For OUPSR protection, traffic streams 320 and 322 include identical content destined for ADN 12b. As described below, these dual OUPSR traffic streams may be implemented by configuring gateway 14 to provide wavelength conversion of stream 302 to prevent interference in network 310.

Traffic stream 320 is originated in a first wavelength/channel, $\lambda_1$, at ADN 12a using a transmitter 104 associated with ring 16. Stream 320 is added to existing optical signals on ring 16 via the coupler 60 of ADN 12a that is associated with ring 16. Although only stream 320 is shown on ring 16, it should be understood that other traffic streams in other wavelengths/channels are also travelling around ring 16. After exiting ADN 12a, stream 320 travels via ring 16 to ADN 12b. The coupler 60 of ADN 12b drops stream 320, along with all other traffic on ring 16. A receiver 102 may then be used to receive stream 320 (for example, using an accompanying filter) and communicate the content in that stream to an appropriate location (for example, a client of ADN 12b). Stream 320 is also forwarded by coupler 60 of ADN 12b, and travels to gateway 14.

Coupler 60a of gateway 14 both drops and forwards traffic on ring 16 coming from ADN 12b (including stream 320). The forwarded traffic is demultiplexed by demultiplexer 206 of gateway 14 into its constituent wavelengths/channels, including stream 320 in $\lambda_1$. Demultiplexed stream 320 is forwarded from the demultiplexer 206 to its associated switch 210. The switch 210 is configured in the illustrated embodiment to terminate stream 320. Such termination is appropriate since traffic in stream 320 is destined for ADN 12b, which this traffic has already reached. The dropped stream 320 included in the traffic dropped from coupler 60a is similarly terminated by configuring the filters 230 associated with the signal regeneration element 220 of the gateway 14 to not forward $\lambda_1$.

Traffic stream 322 is originated in a second wavelength/channel, $\lambda_2$, at ADN 12a using a transmitter 104 associated with ring 18. The use of $\lambda_2$ is used as merely an example and for purposes of distinction. In fact, since ring 16 is separate from ring 18, stream 322 may be (and might typically be)

transmitted in $\lambda_1$. Furthermore, any other appropriate wavelengths/channels may be used to transmit streams 320, 322, and 322'. Stream 322 is added to existing optical signals on ring 18 via the coupler 60 of ADN 12a that is associated with ring 18. Although only stream 322 (and 322') is shown on ring 18, it should be understood that other traffic streams in other wavelengths/channels are also travelling around ring 18. After exiting ADN 12a, stream 322 travels via ring 18 to ADN 12h.

Stream 322 travels, along with other traffic, through ADNs 12h, 12g, 12f, 12e, 12d, and 12c to gateway 14. The traffic stream 322 is not shown as being dropped by ADNs 12h, 12g, 12f, 12e, 12d, and 12c because stream 322 is not destined for these nodes. However, it should be understood that coupler 60 of each of these ADNs both forwards stream 322 (along with the rest of the traffic on ring 18) and drops stream 322 (along with the other traffic). The filters 100 associated with each of these ADNs filter out $\lambda_2$, as described above, since stream 322 is not destined for these nodes.

Upon reaching gateway 14, coupler 60a of gateway 14 both drops and forwards traffic on ring 18 coming from ADN 12c (including stream 322). For the purposes of this example, stream 322 requires wavelength conversion at this point since travel of stream 322 in $\lambda_2$ through gateway 14 will create interference with the traffic originating from ADN 12a in $\lambda_2$. Therefore, once the traffic forwarded by coupler 60a is demultiplexed by demultiplexer 206 of gateway 14, demultiplexed stream 322 in $\lambda_2$ is terminated by a switch 210.

The traffic dropped by coupler 60a is forwarded to a signal regeneration element 220 associated with ring 18. The dropped traffic is split into multiple copies by a splitter 222 and stream 322 is forwarded through to a transponder 232 by a filter 230 selecting $\lambda_2$. Stream 322 is then regenerated using transponder 232 and it wavelength is converted to $\lambda_3$ by transponder 234 (although, as described above, a single transponder may be used in particular embodiments). The regenerated and wavelength converted stream 322' is then combined with other signals being forwarded through the signal regeneration element 220 by a combiner 224, and the combined signal is added to traffic forwarding though mux/demux unit 214 by coupler 60b. This combined traffic is communicated from gateway 14 to ADN 12b, its destination.

Coupler 60 of ADN 12b both forwards stream 322' (along with the rest of the traffic on ring 18) and drops stream 322' (along with the other traffic). One of the filters 100 associated with ADN 12b forwards through $\lambda_3$, since stream 322' is destined for ADN 12b. Stream 322' also continues on to ADN 12a, which drops and filters out stream 322'. Since stream 322' is now in $\lambda_3$, no interference is caused when stream 322' is combined with stream 322 originating from ADN 12a in $\lambda_2$. Stream then 322' travels from ADN 12a to ADN 12h.

As with stream 322, stream 322' travels, along with other traffic, through ADNs 12h, 12g, 12f, 12e, 12d, and 12c to gateway 14. Traffic stream 322' is not shown as being dropped by ADNs 12h, 12g, 12f, 12e, 12d, and 12c because stream 322' is not destined for these nodes. However, it should be understood that coupler 60 of each of these ADNs both forwards stream 322' (along with the rest of the traffic on ring 18) and drops stream 322' (along with the other traffic). The filters 100 associated with each of these ADNs filter out $\lambda_3$, as described above, since stream 322' is not destined for these nodes.

As with stream 322, coupler 60a of gateway 14 both drops and forwards stream 322'. The forwarded stream 322' is terminated by a switch 210 after being demultiplexed by demultiplexer 206. Such termination is appropriate since traffic in stream 322' is destined for ADN 12b, which this traffic has already reached, and since further travel of stream 322' would interfere with the stream 322' originating from gateway 14. The dropped stream 322' included in the traffic dropped from coupler 60a is similarly terminated by configuring the filters 230 associated with the signal regeneration element 220 of the gateway 14 to not forward $\lambda_3$. Therefore, interference is prevented.

In this manner, OUSPR protection can be provided in network 310 through the configuration of gateway 14 and ADNs 12. This protection is implemented in one embodiment by providing traffic stream 320 that travels clockwise around ring 16 from its origin to its destination, and traffic streams 322 and 322' including the same content as the first traffic stream 320 that travel counterclockwise around ring 18. Therefore, protection is provided since the content can reach the destination even if there is a break or other error in rings 16 or 18 at one or more locations. For example, if rings 16 and 18 are broken between ADNs 12a and 12b, traffic stream 320 will not reach ADN 12b. However, traffic stream 322' will reach ADN 12b—thus providing traffic protection. It will be understood that breaks or other errors in network 10 may be dealt with in a similar fashion.

Figure 7:
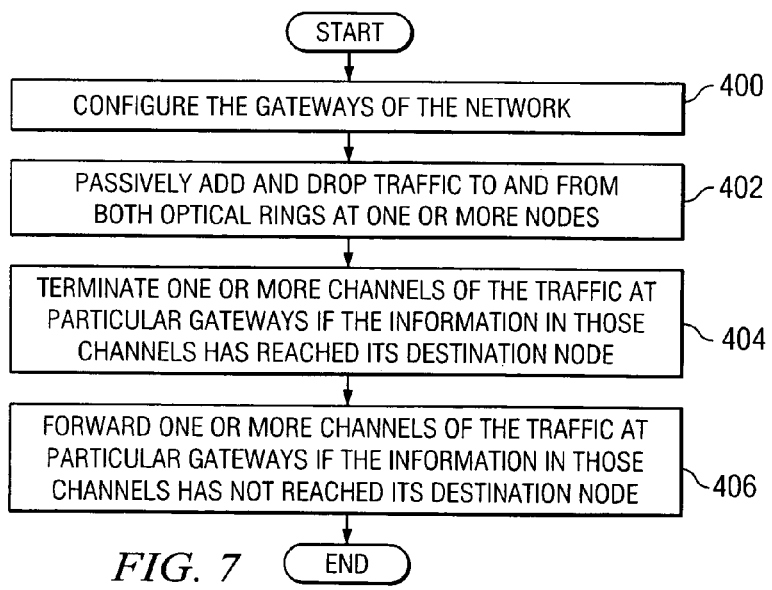
FIG. 7 illustrates an example method for transmitting traffic in an optical network to provide Optical Unidirectional Path-Switched Ring (OUPSR) protection, in accordance with particular embodiments of the present invention.

FIG. 7 illustrates an example method for transmitting traffic in an optical network to provide OUPSR protection in accordance with particular embodiments of the present invention. The method begins with step 400, wherein one or more gateways 14 of a network are configured to either terminate, optically pass-through, regenerate, or regenerate and wavelength convert a signal in each of a plurality of wavelengths/channels in which information is transmitted on the optical rings of the network. As described above, such configuration depends on the origin and destination of the information in each wavelength/channel and the position of a gateway 14 relative to the source and destination nodes for a particular wavelength/channel.

At step 402, traffic is passively added and dropped from the optical rings at each of a plurality of ADNs 12 (and possibly gateways 14 if they also function as add/drop nodes). The traffic comprises content that is destined for different nodes and that is transported in the rings in different wavelengths/channels. As described above, the same content is transmitted from a source node over both rings. As an example only, as illustrated in FIG. 5, information from ADN 12c is transmitted to ADN 12d in stream 320 on ring 16 and in stream 322 on ring 18.

At step 404, those traffic channels that have reached their destination node are terminated at appropriate gateways 14 along the rings. In one embodiment, such termination occurs at the switches of one or more gateways 14, such that the gateways 14 formed the boundaries of subnets within the network. As an example, as illustrated in FIG. 5, traffic stream 320 originating from ADN 12c and destined for ADN 12d is terminated at gateway 14b since the destination has been reached.

At step 406, traffic streams that have not reached their destination node(s) are forwarded through the gateways 14 to allow the destination node to be reached. Depending on the configuration of each gateway 14, such forwarded traffic may be optically passed-through the gateway 14, regenerated by the gateway 14, or regenerated and wavelength converted by the gateway 14. As examples from FIG. 5, stream 322 is optically passed-through gateway 14a, regenerated at gateway 14c, and regenerated and wavelength converted at gateway 14b. Once traffic ceases to be added on network 10, the method ends. It should be understood that since different wavelengths/channels are being added, dropped, terminated, and forwarded at different times and at different locations depending on their source and origin, the steps of the example method may occur in any order and/or simultaneously.

Figure 8:
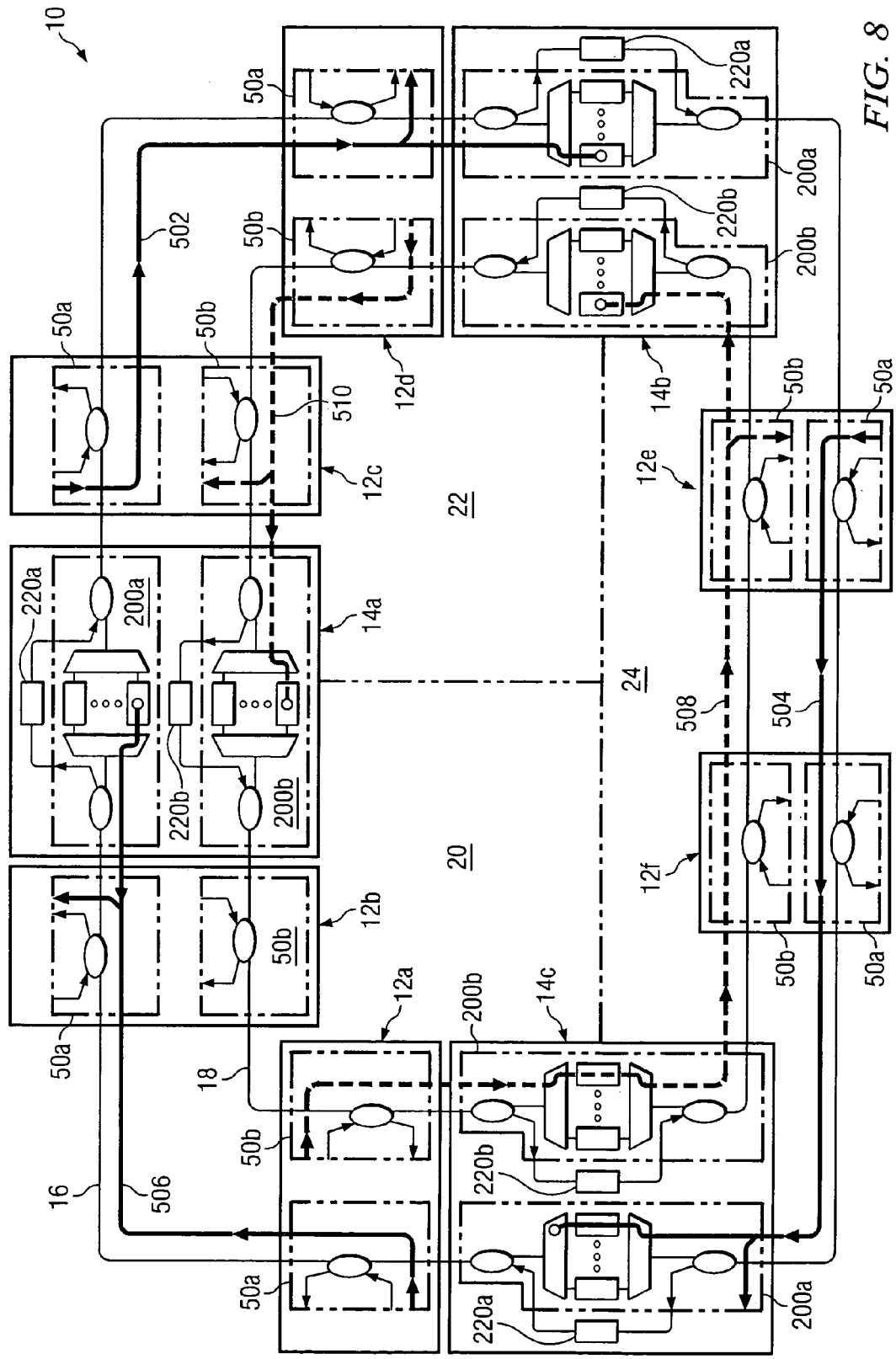
FIG. 8 is a block diagram illustrating example optical signals of an example configuration of the optical network of FIG. 1, in accordance with another embodiment of the present invention.

FIG. 8 is a block diagram illustrating example optical signals of an example configuration of optical network 10 of FIG. 1 in accordance with another embodiment of the present invention. These example optical signals illustrate an implementation of network 10 as an OSPPR network. In FIG. 8, for ease of reference, only high-level details of ADNs 12 and gateways 14 are shown. As described with reference to FIG. 1, the example optical network 10 includes three subnets 20, 22, and 24. Subnet 20 includes ADNs 12a and 12b, subnet 22 includes ADNs 12c and 12d, and subnet 24 includes ADNs 12e and 12f. Gateway 14a divides subnets 20 and 22, gateway 14b divides subnets 22 and 24, and gateway 14c divides subnets 24 and 20.

In the illustrated embodiment, several traffic streams are shown. Some of these streams comprise preemtable signals (or protection channel access (PCA) streams) and protected (or work) signals. Preemtable signals are signals that are terminated to provide protection to other signals. Protected signals are signals for which protection is provided. In the event of a line cut or other interruption causing a protected stream to not reach its destination node(s), one or more preemtable streams may be terminated to allow the protected traffic to be transmitted instead of the preemtable stream. After the interruption has been repaired, the network may revert to its pre-interruption state. In one embodiment, the protection-switchable traffic may comprise higher-priority traffic than the preemtable traffic; however, it will be understood that other divisions of the traffic streams into protected and preemtable portions may be suitable or desirable in other embodiments.

Figure 9:
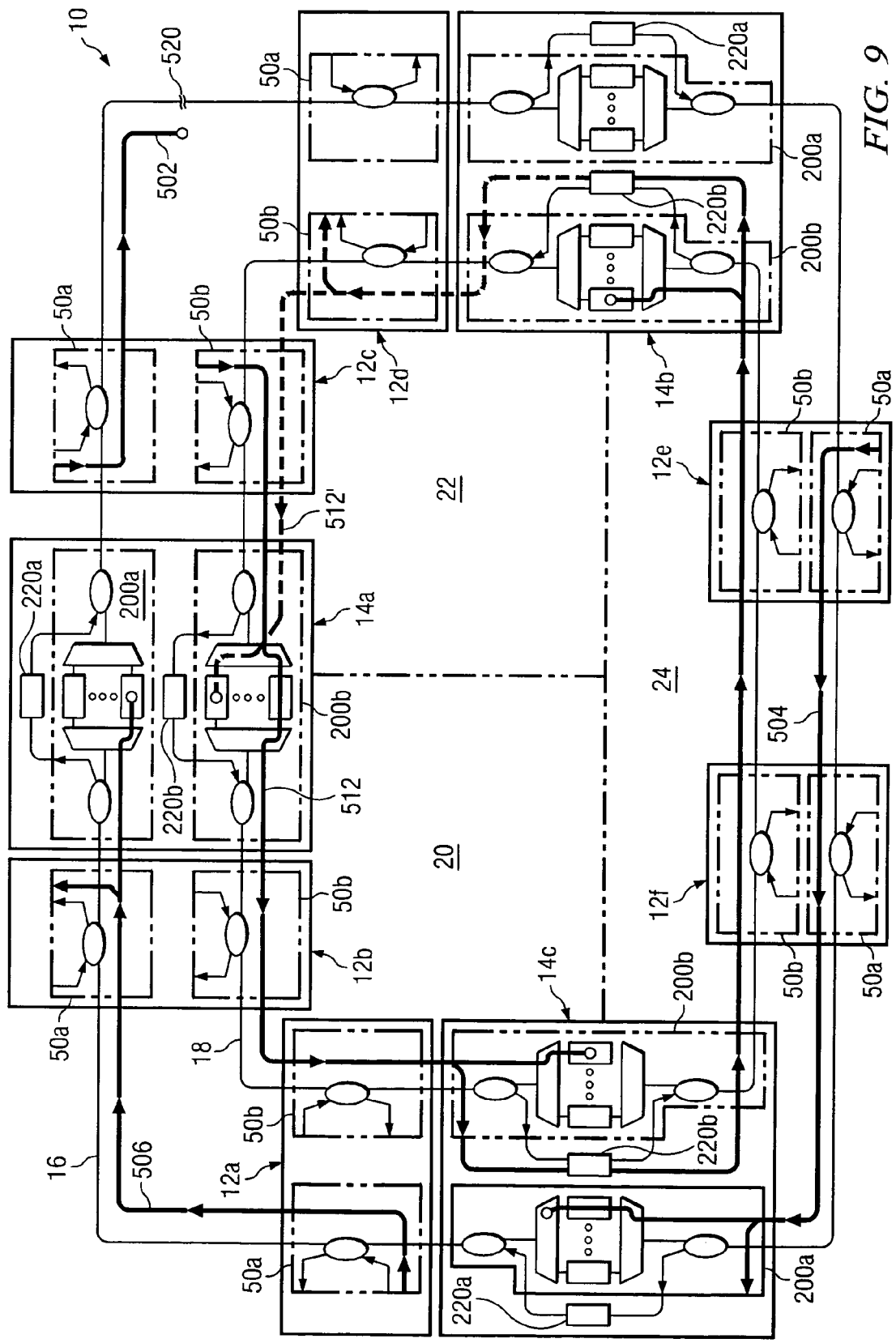
FIG. 9 is a block diagram illustrating protection switching and light path protection of a traffic stream in the network of FIG. 8, in accordance with one embodiment of the present invention.

Referring now to FIG. 8, during normal operations, protected traffic streams 502, 504, and 506 are transmitted in clockwise ring 16 in each of subnets 20, 22, and 24. Traffic stream 502 is a clockwise stream originating from ADN 12c and destined for ADN 12d, traffic stream 504 is a clockwise stream originating from ADN 12e and destined for gateway 14c, and traffic stream 506 is a clockwise stream originating from ADN 12a and destined for ADN 12b. In the illustrated embodiment, protected traffic streams 502, 504, and 506 are transmitted in the same wavelength (for example, $\lambda_1$) in each subnet. Preemtable traffic streams 508 and 510 are transmitted in counterclockwise ring 18 also in $\lambda_1$. Traffic stream 508 is a counterclockwise stream originating from ADN 12a and destined for ADN 12e, and traffic stream 510 is a counterclockwise stream originating from ADN 12d and destined for ADN 12c. As shown in FIG. 9, streams 508 and 510 may be interrupted during protection switching to protect a higher-priority stream.

Although traffic in a single, example wavelength is illustrated, it will be understood that protected traffic and preemtable traffic are transmitted in numerous other wavelengths/channels in rings 16 and 18. Furthermore, although protected traffic is illustrated as being transmitted in the same wavelength as preemtable traffic (although on a different ring), numerous other configurations may be implemented. As an example only, work traffic may be transmitted on ring 16 in odd-numbered channels and in even-numbered channels on ring 18. Preemtable traffic may be transmitted in ring 16 in even-numbered channels and in odd-numbered channels on ring 18. Any other suitable configurations may be used.

Protected traffic stream 502 is originated in a first wavelength, $\lambda_1$, at ADN 12c using a transmitter 104 associated with ring 16. Stream 502 is added to existing optical signals on ring 16 via the coupler 60 of ADN 12c that is associated with ring 16. After exiting ADN 12c, stream 502 travels via ring 16 to ADN 12d. The coupler 60 of ADN 12d drops stream 502, along with all other traffic on ring 16. A receiver 102 may then be used to receive stream 502 and communicate the information in that stream to an appropriate location. Stream 502 is also forwarded by coupler 60 of ADN 12d, and travels to gateway 14b.

Coupler 60a of gateway 14b both drops and forwards traffic on ring 16 coming from ADN 12d (including stream 502). The forwarded traffic is demultiplexed by demultiplexer 206 of gateway 14b into its constituent wavelengths/channels, including stream 502 in $\lambda_1$. Demultiplexed stream 502 is forwarded from the demultiplexer 206 to its associated switch 210. The switch 210 is configured in the illustrated embodiment to terminate stream 502. Such termination is appropriate since traffic in stream 502 is destined for ADN 12d, which this traffic has already reached. The dropped stream 502 included in the traffic dropped from coupler 60a is similarly terminated by configuring the filters 230 associated with the signal regeneration element 220 of gateway 14b to not forward $\lambda_1$. Because stream 502 is terminated before entering subnets 24 and 20, $\lambda_1$ may be reused in these subnets for streams 540 and 506.

Protected traffic stream 504 is originated in wavelength $\lambda_1$ at ADN 12e using a transmitter 104 associated with ring 16. Stream 504 is added to existing optical signals on ring 16 via the coupler 60 of ADN 12e that is associated with ring 16. Stream 504 travels, along with other traffic, from ADN 12e through ADN 12f to gateway 14c. The traffic stream 504 is not shown as being dropped by ADN 12f because stream 504 is not destined for that node. However, it should be understood that coupler 60 of ADN 12f forwards stream 504 (along with the rest of the traffic on ring 16) and drops stream 504 (along with the other traffic). The filters 100 associated with ADN 12f filter out $\lambda_1$, since stream 504 is not destined for this node.

Upon reaching gateway 14c, coupler 60a of gateway 14c both drops and forwards traffic on ring 16 coming from ADN 12f (including stream 504). Since stream 504 is destined for gateway 14c (in this example, gateway 14c includes the components of an add/drop node, as described above), once the traffic forwarded by coupler 60a is demultiplexed by demultiplexer 206 of gateway 14c, demultiplexed stream 504 in $\lambda_1$ is terminated by a switch 210. The traffic dropped by coupler 60a is forwarded to a receiver 232 (for example, via a distributing/combining element 222 and a filter 230) that may then be used to receive stream 504 and communicate the content in that stream to an appropriate location (for example, a client coupled to gateway 14c).

Protected traffic stream 506 is originated in wavelength $\lambda_1$ at ADN 12a using a transmitter 104 associated with ring 16. Stream 506 is added to existing optical signals on ring 16 via the coupler 60 of ADN 12a that is associated with ring 16. After exiting ADN 12a, stream 506 travels via ring 16 to ADN 12b. The coupler 60 of ADN 12b drops stream 506, along with all other traffic on ring 16. A receiver 102 may then be used to receive stream 506 and communicate the content in that stream to an appropriate client of ADN 12b. Stream 506 is also forwarded by coupler 60 of ADN 12b, and travels to gateway 14a.

Coupler 60a of gateway 14a both drops and forwards traffic on ring 16 coming from ADN 12b (including stream 506). The forwarded traffic is demultiplexed by demultiplexer 206 of gateway 14a into its constituent wavelengths/channels, including stream 506 in $\lambda_1$. Demultiplexed stream 506 is forwarded from the demultiplexer 206 to its associated switch 210. The switch 210 is configured in the illustrated embodiment to terminate stream 506. Such termination is appropriate since traffic in stream 506 is destined for ADN 12b, which this traffic has already reached. The dropped stream 506 included in the traffic dropped from coupler 60a is similarly terminated by configuring the filters 230 associated with the signal regeneration element 220 of gateway 14a to not forward $\lambda_1$. Because stream 506 is terminated before entering subnets 22 and 24, $\lambda_1$ may be reused in these subnets for streams 502 and 504.

Preemtable traffic stream 508 is originated in the first wavelength, $\lambda_1$, at ADN 12a using a transmitter 104 associated with ring 18. Stream 508 is added to existing optical signals on ring 18 via the coupler 60 of ADN 12a that is associated with ring 18. After exiting ADN 12a, stream 302 travels via ring 18 to gateway 14c.

Coupler 60a of gateway 14c both drops and forwards traffic on ring 18 coming from ADN 12a (including stream 508). The forwarded traffic is demultiplexed by demultiplexer 206 of gateway 14c into its constituent wavelengths/channels, including stream 508. Demultiplexed stream 508 is forwarded from the demultiplexer 206 to its associated switch 210, where it is forwarded through. Such forwarding is appropriate since traffic in stream 508 is destined for ADN 12e, which this traffic has not yet reached, and since it is assumed that the stream 508 does not need to be regenerated (regeneration could be performed if needed). The forwarded stream 508 is recombined with other demultiplexed traffic using multiplexer 204. The dropped stream 508 included in the traffic dropped from coupler 60a is filtered out at the signal regeneration element 220.

Stream 508 travels, along with other traffic, from gateway 14c through ADN 12f to ADN 12e. The coupler 60 of ADN 12e drops stream 508, along with all other traffic on ring 18. A receiver 102 may then be used to receive stream 508 and communicate the information in that stream to an appropriate location. Stream 508 is also forwarded by coupler 60 of ADN 12e, and travels to gateway 14b, where it is terminated (since the destination has been reached).

Preemtable traffic stream 510 is originated in wavelength $\lambda_1$ at ADN 12d using a transmitter 104 associated with ring 18. Stream 510 is added to existing optical signals on ring 18 via the coupler 60 of ADN 12d that is associated with ring 18. After exiting ADN 12d, stream 510 travels via ring 18 to ADN 12c. The coupler 60 of ADN 12c drops stream 510, along with all other traffic on ring 18. A receiver 102 may then be used to receive stream 510 and communicate the information in that stream to an appropriate client. Stream 510 is also forwarded by coupler 60 of ADN 12c, and travels to gateway 14a, where it is terminated (since the destination has been reached).

Therefore, through the use of gateways 14 to provide subnets, rings 16 and 18 may be used to communicate different information in different subnets using the same wavelength. Furthermore, since some of this traffic (in the example above, the traffic on ring 18) is deemed preemtable, OSPPR protection can be implemented in the case of a failure in ring 16 and/or ring 18, as described below.

FIG. 9 is a block diagram illustrating protection switching and light path protection of the traffic stream 502 of FIG. 8 in accordance with one embodiment of the present invention. In the event of a line cut or other interruption, an alternate light path is created for protected channels that are prevented from reaching their destination node(s) due to the interruption. If the alternate light path would result in interference from preemtable traffic in the same channel, the preemtable traffic is terminated. In the illustrated example, preemtable traffic streams 508 and 510 need to be terminated to provide an alternative light path over ring 18 (since these traffic streams in $\lambda_1$ are in the protection path). However, as previously noted, it will be understood that other divisions of traffic may be utilized without departing from the scope of the present invention.

In the illustrated example, a line cut 520 prevents traffic stream 502 from reaching its destination node (ADN 12d) via ring 16. This problem may be detected by one or more nodes or other equipment in network 10 and may be reported to NMS 126. NMS 126 may direct, pursuant to the OPSSR protection switching protocol of this embodiment, the termination of preemtable traffic streams 508 and 510 to free the use of $\lambda_1$ in ring 18 for protection traffic. After the preemtable traffic streams have been terminated, NMS 126 may direct ADN 12c to begin transmitting the content in stream 502 via ring 18 instead of or in addition to ring 16.

This new protection stream 512 containing the content of stream 502 is originated in wavelength $\lambda_1$ at ADN 12c using a transmitter 104 associated with ring 18 (although in other embodiments, a single transmitter may transmit the same signal over both rings 16 and 18). Stream 512 is added to existing optical signals on ring 18 via the coupler 60 of ADN 12c that is associated with ring 18. After exiting ADN 12c, stream 512 travels via ring 18 to gateway 14a. Coupler 60a of gateway 14a both drops and forwards traffic on ring 18 coming from ADN 12b (including stream 512). The forwarded traffic is demultiplexed by demultiplexer 206 of gateway 14a into its constituent wavelengths/channels, including stream 512 in $\lambda_1$. Demultiplexed stream 512 is forwarded from the demultiplexer 206 to its associated switch 210. The switch 210 is configured in the illustrated embodiment to forward stream 512 since it is destined for ADN 12d (and since stream 512 does not need to be regenerated or wavelength converted at this point because in the illustrated embodiment the distance from ADN 12c to gateway 14a is not large enough the require signal regeneration). The forwarded stream 512 is recombined with other demultiplexed traffic using multiplexer 204. The dropped stream 512 included in the traffic dropped from coupler 60a is terminated (since no regeneration or wavelength conversion is needed) by configuring the filters 230 associated with the associated signal regeneration element 220 of the gateway 14a to not forward $\lambda_1$.

Stream 512 travels, along with other traffic, from gateway 14a through ADNs 12b and 12a to gateway 14c. The traffic stream 512 is not shown as being dropped by ADNs 12b and 12a because stream 512 is not destined for these nodes. However, it should be understood that coupler 60 of ADNs 12b and 12a both forwards stream 512 (along with the rest of the traffic on ring 18) and drops stream 512 (along with the other traffic). The filters 100 associated with ADNs 12b and 12a filter out $\lambda_1$.

Upon reaching gateway 14c, coupler 60a of gateway 14c both drops and forwards traffic on ring 18 coming from ADN 12a (including stream 512). For the purposes of this example, stream 512 requires regeneration due to the distance it has traveled around ring 18 to this point. Therefore, once the traffic forwarded by coupler 60a is demultiplexed by demultiplexer 206 of gateway 14c, demultiplexed stream 512 in $\lambda_1$ is terminated by a switch 210.

The traffic dropped by coupler 60a is forwarded to a signal regeneration element 220 associated with ring 18. The dropped traffic is split into multiple copies by a splitter 222 and stream 512 is forwarded through to a transponder 232 by a filter 230. Stream 512 is then regenerated using transponder 232 and/or transponder 234 (although, as described above, a single transponder may be used in particular embodiments). No wavelength conversion is performed at this point in the illustrated example. The regenerated stream 512 is then combined with other signals being forwarded through the signal regeneration element 220 by a combiner 224, and the combined signal is added to traffic forwarding though mux/demux unit 214 by coupler 60b. This combined traffic is communicated from gateway 14c to ADN 12f. Stream 512 travels, along with other traffic, from gateway 14c through ADNs 12f and 12e to gateway 14b.

Upon reaching gateway 14b, coupler 60a of gateway 14b both drops and forwards traffic on ring 18 coming from ADN 12e (including stream 512). For the purposes of this example, stream 512 requires wavelength conversion at this point since travel of stream 512 in $\lambda_1$, into subnet 22 will create interference with traffic originating from ADN 12c in $\lambda_1$. Therefore, once the traffic forwarded by coupler 60a is demultiplexed by demultiplexer 206 of gateway 14b, demultiplexed stream 512 in $\lambda_1$ is terminated by a switch 210.

The traffic dropped by coupler 60a is forwarded to a signal regeneration element 220 associated with ring 18. The dropped traffic is split into multiple copies by a splitter 222 and stream 512 is forwarded through to a transponder 232 by a filter 230. Stream 512 is then regenerated and its wavelength is converted to a second wavelength, $\lambda_2$, using transponders 232 and/or 234. The regenerated and wavelength converted stream 512' is then combined with other signals being forwarded through the signal regeneration element 220 by a combiner 224, and the combined signal is added to traffic forwarding though mux/demux unit 214 by coupler 60b. This combined traffic is communicated from gateway 14b to ADN 12d.

Coupler 60 of ADN 12d both forwards stream 512' (along with the rest of the traffic on ring 18) and drops stream 512' (along with the other traffic). One of the filters 100 associated with ADN 12d forwards through $\lambda_2$, since stream 512' is destined for ADN 12d, and a receiver 102 may then be used to receive stream 512' and communicate the information in that stream to an appropriate location. Therefore, the content which was not able to reach ADN 12d in stream 502 due to line cut 520, is able to reach ADN 12d in streams 512/512'.

Stream 512' also continues on to ADN 12c, which drops but filters out stream 512'. Since stream 512' is now in $\lambda_2$, no interference is caused when stream 512' is combined with stream 512 originating from ADN 12c in $\lambda_1$. Stream 512' then travels from ADN 12c to gateway 14a, which terminates stream 512'. In this way, an alternate path from ADN 12c to ADN 12d is created without creating interference with other traffic. In an alternative embodiment, stream 512 could be wavelength converted to stream 512' at gateway 14a, thus allowing traffic stream 508 to no be preempted.

After repair of the line cut, the network is reverted to its pre-protection switching state illustrated in FIG. 8. Specifically, protection traffic streams 512 and 512' are terminated, protected traffic stream 502 is resumed (if it was terminated), and preemptable traffic streams 508 and 510 are resumed.

Figure 10:
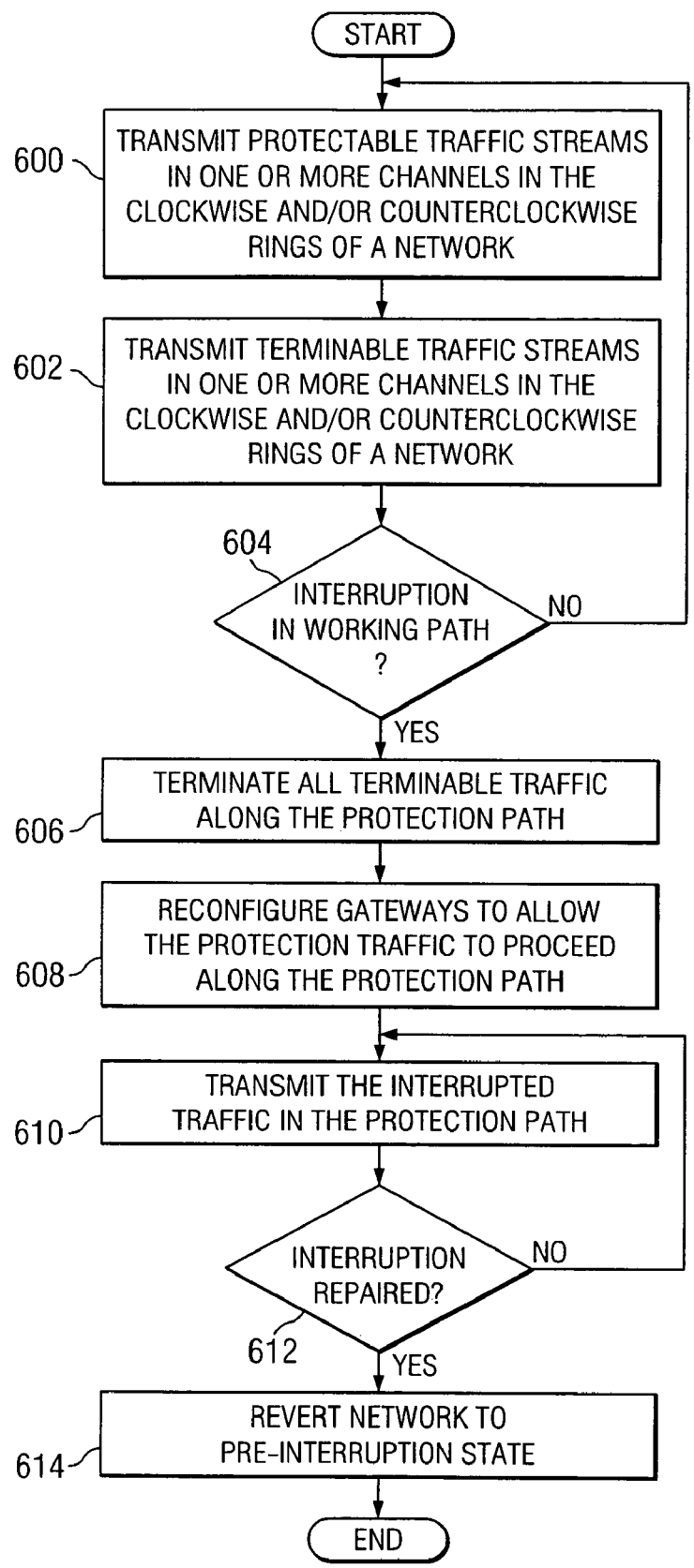
FIG. 10 illustrates an example method for transmitting traffic in an optical network to provide Optical Shared Path Protection Ring (OSPPR) protection, in accordance with particular embodiments of the present invention.

FIG. 10 illustrates an example method for transmitting traffic in an optical network to provide OSPPR protection in accordance with particular embodiments of the present invention. The method begins with step 600, wherein one or more protected traffic streams are transmitted in one or more wavelengths in the clockwise and/or counterclockwise rings of a network. At step 602, one or more preemptable traffic streams are transmitted in one or more wavelengths in the clockwise and/or counterclockwise rings of a network. As described above, the protected traffic may be transmitted in one ring of the network and the preemptable traffic may be transmitted in the other ring of the network. Alternatively, the protected traffic may be transmitted in particular wavelengths/channels of each ring, and the preemptable traffic may be transmitted in other wavelengths/channels of each ring. Any appropriate channel apportionment may be used, and such appropriate apportionments will account for the need to convert the wavelength of particular traffic when required to provide protection in the case of a network fault. Furthermore, the channel use may be apportioned so as to efficiently utilize network capacity.

At decisional step 604, it is determined whether there has been an interruption of a working path of a protected traffic stream. Such interruption may comprise a line cut or other interruption that prevents the protected traffic stream from reaching its destination node(s). If no interruption has occurred, the method returns to step 600. If an interruption has occurred, at step 606, any preemptable traffic along the protection path is terminated. At step 608, the gateways 14 in the network are reconfigured to allow the protection traffic to proceed along the protection path. In particular embodiments, this may be accomplished by configuring at least one of the gateways 14 to convert the wavelength of the protection traffic to prevent interference in the network. One or more gateways 14 may also be configured in such embodiments to regenerate the protection traffic (without converting its wavelength) to provide for relatively large optical ring sizes. It should be noted that if multiple working paths have faults and the protected traffic on those working paths share a protection path, then the protected traffic with the highest priority may be given the protection path.

At step 610, the source ADN 12 of the interrupted traffic switches the direction of the interrupted traffic and transmits the interrupted traffic in the protection path. At decisional step 612, it is determined whether the interruption has been repaired. If the interruption has not been repaired, the method returns to step 610, and the interrupted traffic continues to be transmitted in the protection path. If the interruption has been repaired, the method proceeds to step 614, where the network is reverted to its pre-interruption state, and the method ends. This method is repeated as long as protection is to be provided in the network.

In complex communicating environments, multiple optical networks, such as network 10 of FIG. 1 or any other appropriate optical networks, may communicate with each other such that traffic may be added and/or dropped from one network to another within a network system.

Figure 11:
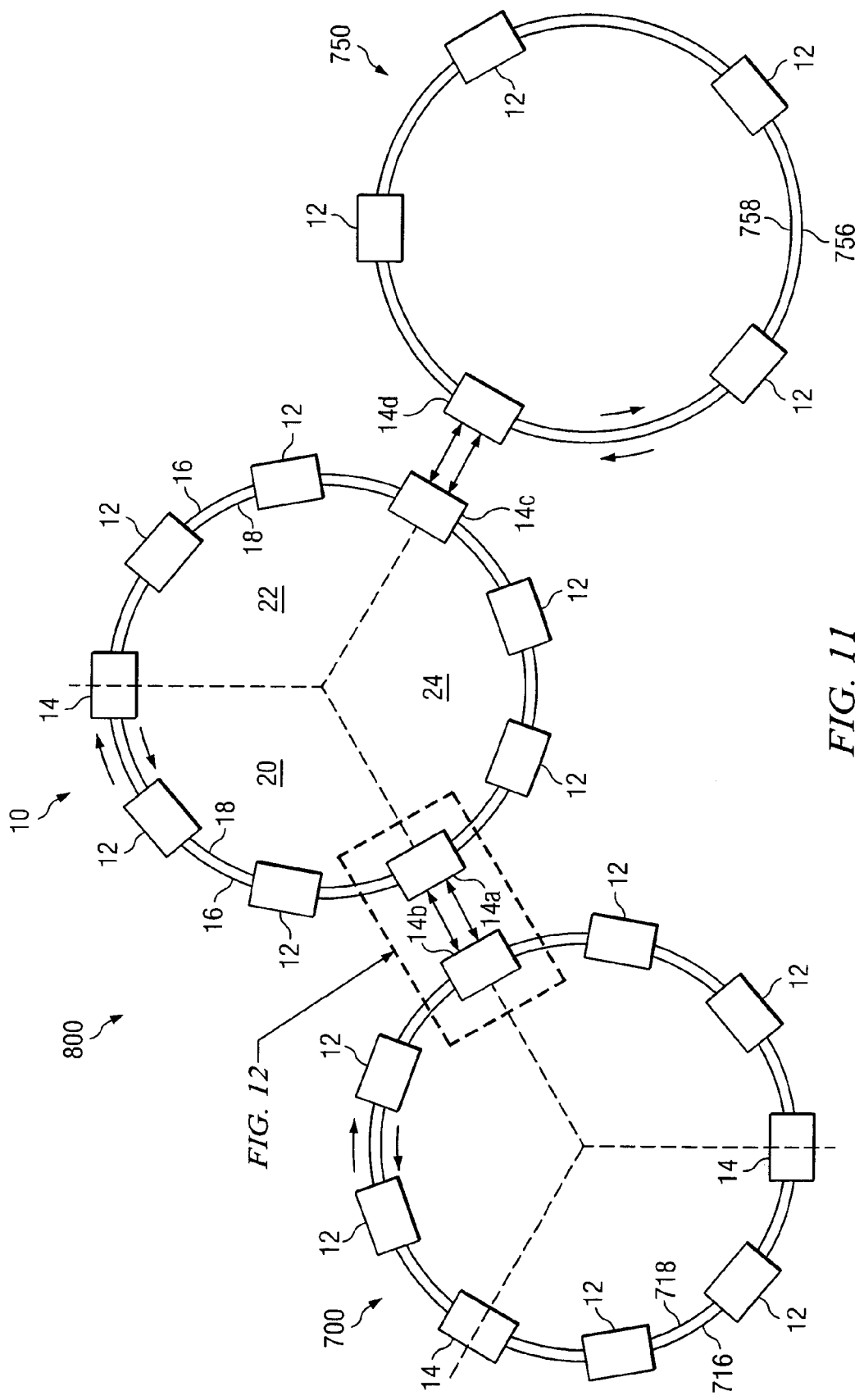
FIG. 11 illustrates a block diagram of an example optical network system in accordance with one embodiment of the present invention.

FIG. 11 is a block diagram illustrating an optical network system 800 in accordance with one embodiment of the present invention. In accordance with this embodiment, networks 10, 700, and 750 are each optical ring networks coupled together to form network system 800. Although particular configurations of optical networks 10, 700, and 750 are illustrated, network system 800 may comprise any appropriate number or types of networks. In the illustrated embodiment, networks 10 and 700 are optical ring networks having multiple ADNs 12 and gateways 14, such that the networks are divided into subnets as described previously with reference to FIG. 1. Optical network 750 comprises a plurality of ADNs 12 and a single gateway 14. Networks 10 and 700 may be coupled together by their associated gateways 14a and 14b, while networks 10 and 750 may be coupled together by their associated gateways 14c and 14d. These connections are made so that traffic may be communicated between the networks. Although the example networks are coupled at gateways 14, the networks may also be coupled using ADNs 12 in other embodiments, as described below with reference to FIG. 13.

Figure 12:
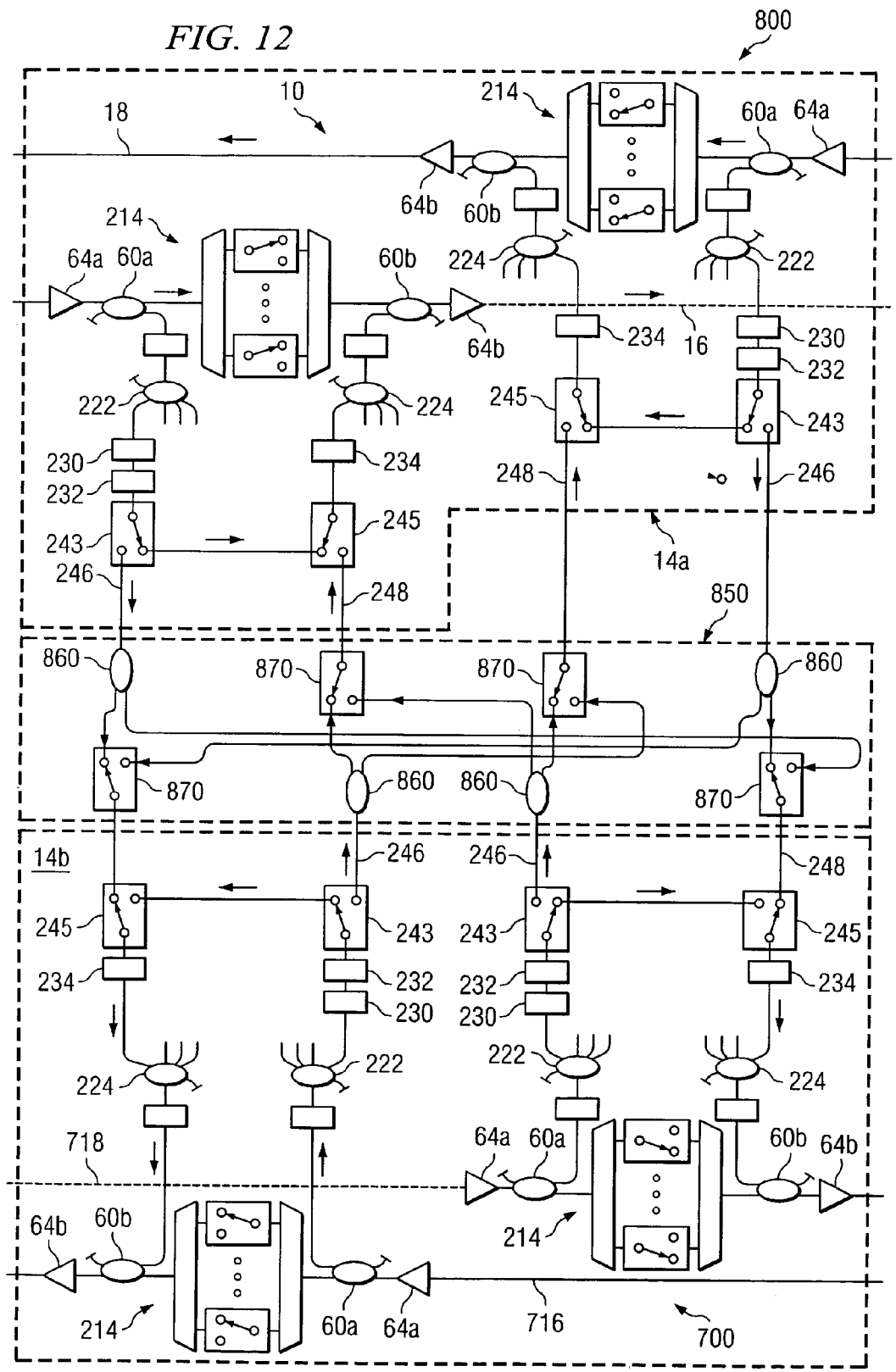
FIG. 12 illustrates a detailed view of one embodiment of the connections between gateways of the optical networks in the optical network system of FIG. 11.

FIG. 12 illustrates a detailed view of the connection between gateways 14a and 14b of networks 10 and 700, respectively. In the illustrated embodiment, gateways 14a and 14b each comprise gateway 14 of FIG. 4A with regeneration element 240 of FIG. 4B replacing regeneration element 220 of FIG. 4A. Gateways 14a and 14b are coupled using interconnection module 850. Interconnection module 850 is connected to switches 243 and 245 of each gateway 14 to form a path over which traffic may be communicated between gateways 14 and their associated networks. There is an interconnection module 850 for each wavelength to be communicated between the networks. Each switch 243 is operable to communicate an optical signal to either switch 245 of gateways 14 for regeneration and/or wavelength conversion, as described above, or to interconnection module 850. The optical signal communicated by each switch 243 is represented by arrow 246. Each switch 245 may be operated to either receive optical signals from the associated switch 243 or from interconnection module 850. The optical signal received by each switch 245 is represented by arrow 248.

Interconnection module 850 comprises a plurality of optical splitters 860 and a plurality of switches 870. Each splitter 860 is coupled to a switch 243 associated with a first network that is dropping traffic to a second network which receives the dropped traffic. Each switch 870 is coupled to a switch 245 of the second network and is further coupled to a splitter 860 coupled to the first network. Although splitters 860 and switches 870 are described as being a part of interconnection module 850, these components could also be included in gateways 14 or ADNs 12, thereby eliminating the need for interconnection module 850.

Signals 246 received by optical splitters 860 are divided into two optical signals, each containing substantially identical content and/or energy. These optical signals are then received by switches 870 associated with the rings 16 and/or 18 of the optical network onto which the signals are to be added. The particular configuration of switches 870 determines which signals dropped from the first optical network will be added to which rings of the second optical network.

In certain applications, optical transponder 234 may be omitted from gateway 14. For example, but not by way of limitation, if the destination node is located in close proximity to a gateway 14, such as if the destination node is the next node in the network, transponder 234 may not be required because the distance between the destination node and the gateway node 14 is short enough that the optical signal may be transmitted to the destination node with a low bit-error ratio, thereby substantially reducing the need for optical transponder 234.

FIG. 13 illustrates an example method for passively communicating traffic from a first optical ring network 10 to a second optical ring network 700, using gateways 14 associated with each network, as illustrated in FIG. 12. The method begins at step 900, where ingress traffic is received at coupler 60a of a gateway 14 on an optical ring 16/18 of the first optical network 10. At step 902, first and second copies of the ingress traffic are generated by coupler 60a. At step 904, the first and second copies of the ingress traffic are passively forwarded by coupler 60a. The first copy is passively forwarded to multiplexer/demultiplexer unit 214 and the second copy is passively forwarded to splitter 222. At step 906, the second copy of the ingress traffic is split into multiple substantially identical copies by splitter 222. At step 908, at least one of the copies of the second copy is filtered into one or more constituent wavelengths at filter 230. At step 910, switch 870 selectively forwards one or more of the constituent wavelengths of the second copy of the ingress traffic to optical network 700. At step 912, one or more wavelengths of the forwarded signal are received at the either a node (such as an ADN 12 or a gateway 14) coupled to optical network 700. At step 914, one or more wavelengths of the forwarded signal are added at an optical ring 716/718 of optical network 700 using coupler 60b.

Although an example method is illustrated, the present invention contemplates two or more steps taking place substantially simultaneously or in a different order. In addition, the present invention contemplates using methods with additional steps, fewer steps, or different steps, so long as the methods remain appropriate for passively adding traffic from a first optical ring network to a second optical ring network. In addition, ADNs may be similarly interconnected using interconnection module 850. For example, similar to the coupling of transponder 232 of gateway 14 to splitter 860 of interconnection module 850, receiver 102 of ADN 12 may be coupled to splitter 860 when ADNs 12 are interconnected using module 850. Also, similar to the coupling of transponders 234 of gateway 14 to switch 870 of module 850, transmitters 104 may be coupled to switches 870 when ADNs 12 are interconnected using module 850.

Figure 14:
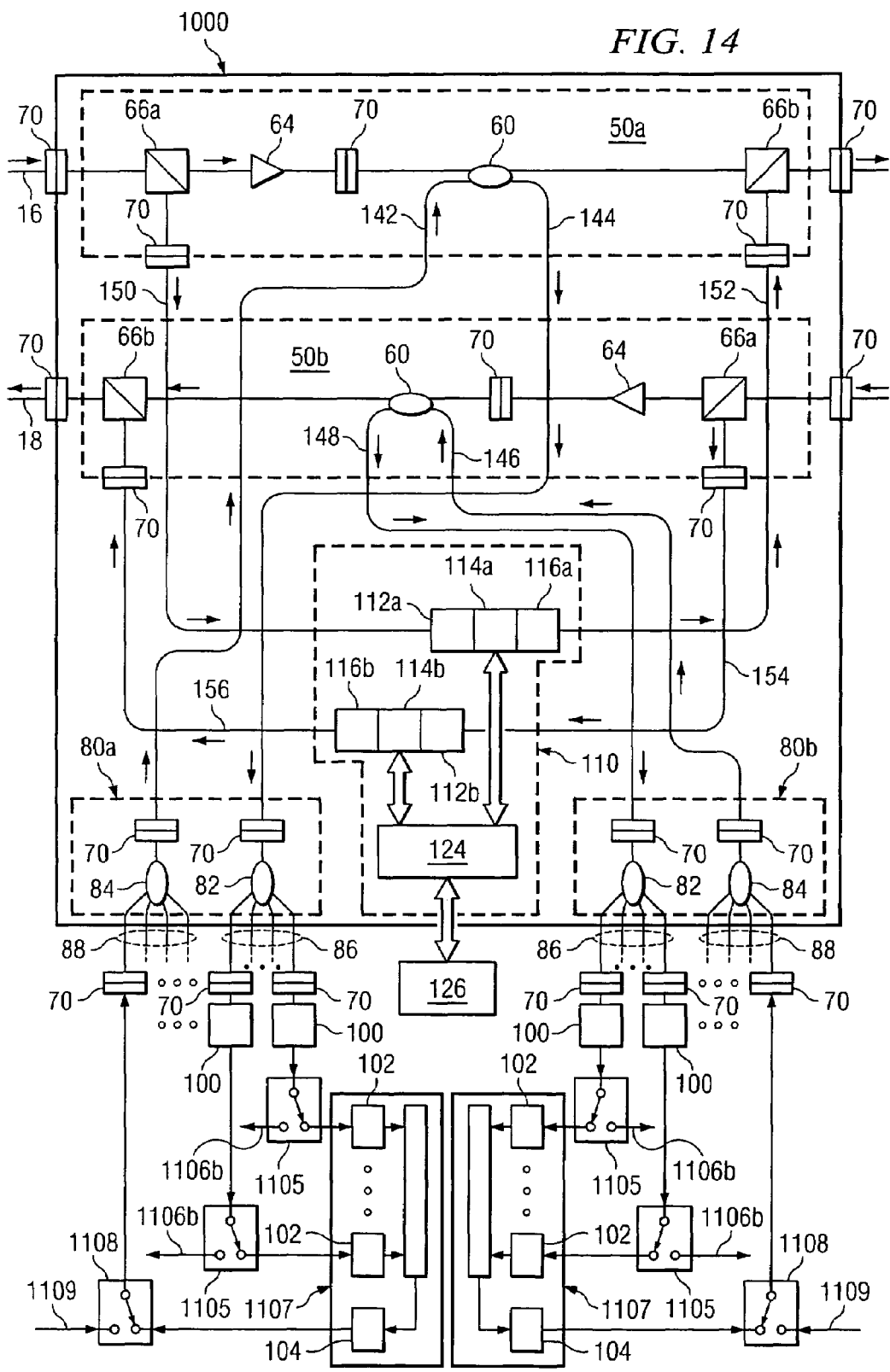
FIG. 14 illustrates a block diagram of an example add/drop node according to one embodiment of the present invention.

FIG. 14 is a block diagram illustrating details of an ADN 1000, which is a modification of ADN 12 of FIG. 2, in accordance with an embodiment of the present invention. In this embodiment, ADN 1000 comprises elements that are similar to those contained in ADN 12 of FIG. 2. However, in addition to the components contained in ADN 12, ADN 1000 contains optical switches 1105 coupled to multiplexers 1107 having optical receivers 102 associated with each wavelength that is communicated from each ring of the network. ADN 1000 also includes a switch 1108 associated with each wavelength communicated to each ring of the network. The addition of multiplexers 1107 allows ADN 1000 to selectively (using switches 1105) multiplex the signals contained in two or more received channels into a multiplexed signal contained in one channel, thereby reducing the channel count on the network and maximizing wavelength resources.

As with distributing/combining elements 80 of FIG. 2, drop leads 86 may be connected to one or more tunable filters 100 which in turn may be connected to one or more broadband optical receivers 102 of multiplexer 1107 through switches 1105 as illustrated in FIG. 14. Optical receivers 102 may be coupled to one or more switches 1105 which may be configured to drop the received optical signals (represented by locally-destined traffic 1106) or pass the optical signals to multiplexer 1107. Multiplexer 1107 multiplexes the optical signals passed to it. Multiplexer 1107 then passes the multiplexed signal to switch 1108. Depending upon the configuration of switch 1108, either the multiplexed signal from multiplexer 1107 or locally-derived traffic 1109 will be added to rings 16 and/or 18.

Multiplexing of dropped optical signals maximizes wavelength resources on the network. In a particular embodiment, multiplexer 1107 may connect two GbE channels dropped from optical ring 18 to one OC-48 SONET channel which is added back onto optical ring 18. In another example, eight GbE channels may be multiplexed into one OC-192 SONET channel. Although this discussion illustrates specific examples of the types of signals that may be dropped from an optical ring, any appropriate type of optical signal may be dropped and multiplexed as discussed above.

The signals passing through switches 1108, whether multiplexed signals (which are converted to optical format by optical transmitters 104 of multiplexer 1107) or locally-derived signals 1109 (which are assumed in the illustrated example to be in optical format when received at switches 1108) are transmitted to distributing/combining elements 80 over leads 88 where the signals are combined by combiners 84 and forwarded to transport elements 50a and 50b, as described above, via counterclockwise add segment 142 and clockwise add segment 146, as illustrated in FIG. 14.

Figure 15:
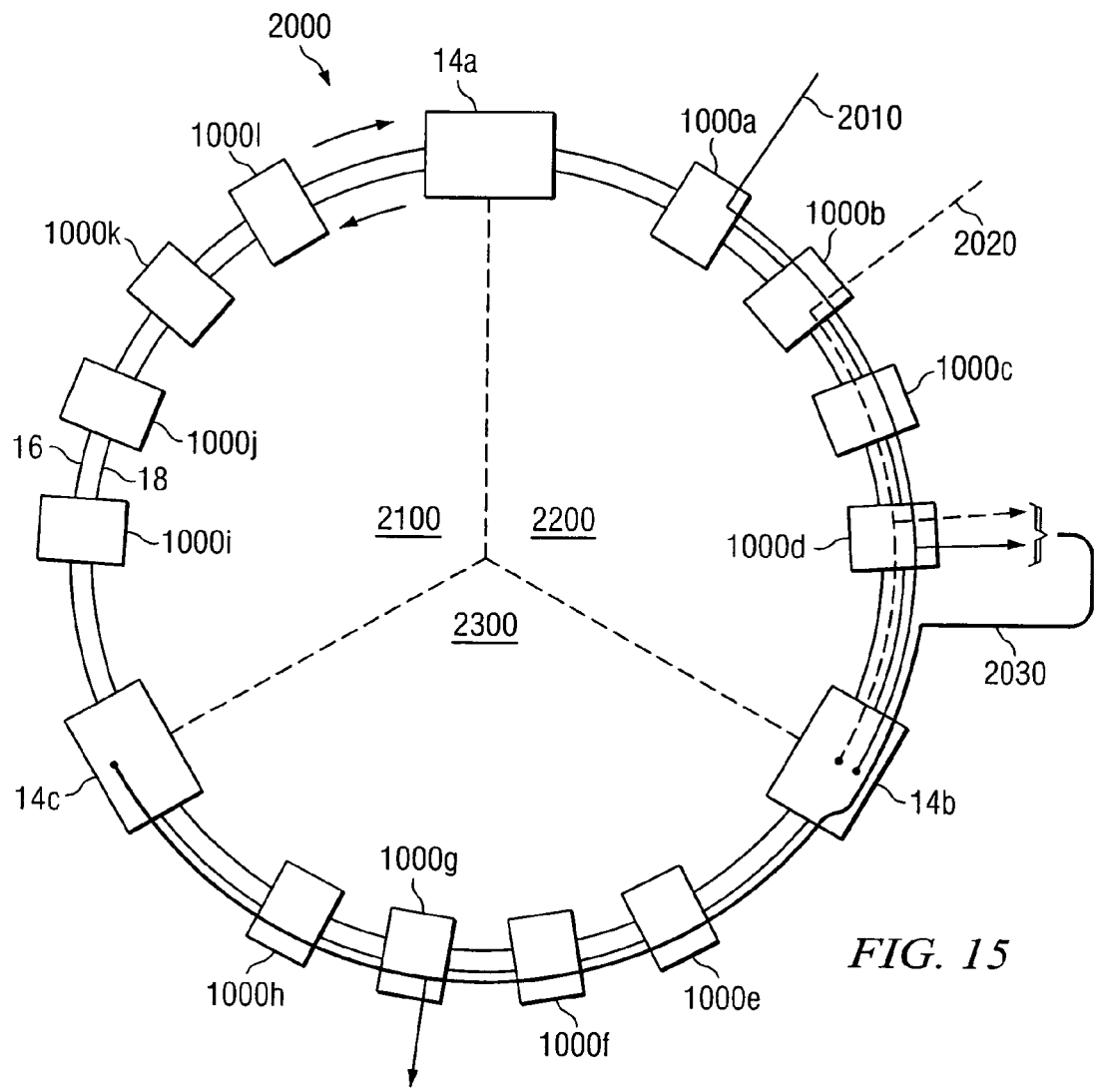
FIG. 15 illustrates an example optical network with multiplexing nodes according to one embodiment of the present invention.

FIG. 15 illustrates an example optical network 2000 comprising ADNs 1000 of FIG. 14 according to one embodiment of the present invention. FIG. 15 illustrates that, in a particular embodiment, signals contained in two channels 2010 and 2020 may be added to optical ring network 2000 at ADNs 1000a and 1000b, respectively. The signals contained in channels 2010 and 2020 travel along ring 16 of network 2000 where they are multiplexed into a single channel 2030 at ADN 1000d using multiplexer 1107, as described with reference to FIG. 14. In a particular embodiment, the signals contained in channels 2010 and 2020 may each comprise GbE signals and multiplexed channel 2030 may comprise an OC-48 SONET signal. Although this discussion illustrates specific examples of the types of signals that may be multiplexed by ADNs 1000, any appropriate type of optical signal may be dropped and multiplexed as discussed above.

The signals contained in channels 2010 and 2020 continue to travel along ring 16 until they are terminated at gateway 14b. The multiplexed signals contained in channel 2030 continue to travel on ring 16 until they reaches their termination point (gateway 14c in the illustrated embodiment). In this manner, only the signals contained in a single channel (i.e., channel 2030) are transmitted in subnet 2300, rather than the signals contained in the two original channels (i.e., channels 2010 and 2020) that were originally transmitted in subnet 2200, thus more efficiently utilizing wavelength resources in network 2000. As the signals contained in channel 2030 travel around ring 16, their content may be dropped to another destination, such as a local client or another optical network, at ADNs along ring 16, such as ADN 1000g in the illustrated embodiment. In an alternate embodiment, the multiplexing may be accomplished, in a manner similar to that described above with reference to multiplexers 1107 of FIG. 14, at a gateway 14 rather than at an ADN 1000.

Figure 16:
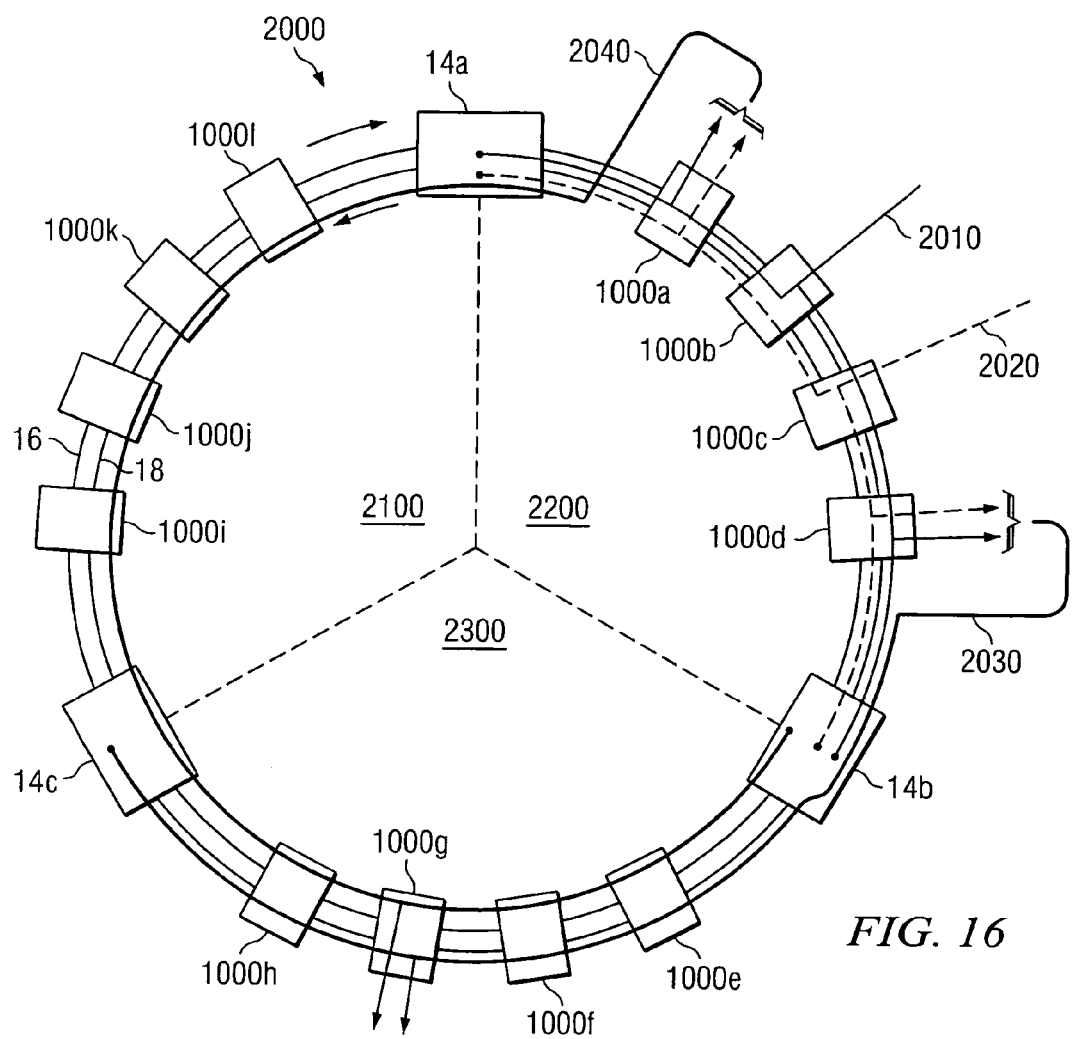
FIG. 16 illustrates an example optical network with multiplexing nodes according to another embodiment of the present invention.

FIG. 16 illustrates an example optical network 2000 comprising nodes 1000 of FIG. 14 according to one embodiment of the present invention in which OUPSR protection is implemented in combination with channel multiplexing. FIG. 16 illustrates that, in a particular embodiment, the signals contained in channels 2010 and 2020 may be added to optical ring network 2000 at ADNs 1000b and 1000c, respectively. The signals contained in channels 2010 and 2020 travel along ring 16 of network 1000 where they are multiplexed into a single channel 2030 at ADN 1000d using multiplexers 1107, as described with reference to FIG. 14. In a particular embodiment, the signals contained in channels 2010 and 2020 may each comprise GbE signals and multiplexed channel 2030 may comprise an OC-48 SONET signal. Although this discussion illustrates specific examples of the types of signals that may be multiplexed by ADNs 1000, any appropriate type of optical signal may be dropped and multiplexed as discussed above.

The signals contained in channels 2010 and 2020 continue to travel along ring 16 until they are terminated at gateway 14b. The multiplexed signals contained in channel 2030 continue to travel on ring 16 to their destination location (ADN 1000g in the illustrated embodiment). The signals contained in channel 2030 are terminated when they reach a termination point (gateway 14c in the illustrated embodiment). According to one embodiment, in order to provide OUPSR protection, the signals contained in channels 2010 and 2020 are also transmitted along ring 18 to ADN 1000a where they are multiplexed into channel 2040. The multiplexed signals contained in channel 2040 are transmitted on ring 18 to their destination location (ADN 1000g in the illustrated embodiment). The signals contained in channel 2040 are terminated when they reach a termination point (gateway 14b in the illustrated embodiment). In this manner, the signals contained in channels 2010 and 2020 may reach their destination locations even if one ring of the network is interrupted.

FIG. 17 illustrates an example method for transmitting multiplexed traffic on an optical ring of an optical ring network 2000. The method begins at step 2402 where ADNs 1000b and 1000c add optical signals 2010 and 2020, respectively, on ring 16 of network 2000. At step 2404, signals 2010 and 2020 are received at ADN 1000d and the optical coupler 60 of ADN 1000d that is coupled to ring 16 creates a first and a second copy of signals 2010 and 2020 (along with any other traffic received on ring 16). The first copy is forwarded along ring 16 and the second copy is dropped to distributing/combining element 80a, as described above. At step 2406, as described above, the second copy of signals 2010 and 2020 is multiplexed to create a signal 2030. At step 2408, multiplexed signal 2030 is combined with the first copy of signals 2010 and 2020 at coupler 60 (along with the other traffic forwarded by coupler 60). At step 2410, ADN 1000d forwards multiplexed signal 2030 and the first copy of the received traffic, including signals 2010 and 2020, on ring 16 to the next node on ring 16, gateway node 14b.

At step 2412, gateway node 14b receives signals 2010, 2020, and 2030 on ring 16. At step 2414, gateway node 14b terminates signals 2010 and 2020. These signals are terminated because the information contained in signals 2010 and 2020 is also contained in signal 2030. Thus, by eliminating the traffic containing signals 2010 and 2020 and retaining signal 2030, the information contained in signals 2010 and 2020 is still present in the network in multiplexed signal 2030, but the number of signals required to transmit the traffic is reduced, thereby increasing the available network resources. At step 2416, gateway 14b forwards signal 2030 to another node on the network, such as ADN 1000g, where a copy of the signal may be dropped to a local client or another network while another copy of signal 2030 is forwarded to gateway 14c. At step 2418, gateway 14c terminates signal 2030 to prevent interference with signal 2030 being added at ADN 1000d.

In order to provide OUPSR protection on network 2000, as shown in FIG. 16, steps 2402 through 2418 may be implemented in a similar manner for traffic added to ring 18. In this case, signals 2010 and 2020 are multiplexed into signal 2040 at ADN 1000a and signals 2010 and 2020 are terminated at gateway 14a. Signal 2040 is forwarded to another node on the network, such as 1000g, where the signal may be dropped to a local client or another network. Note, however, that signals 2030 and 2040 pass each other in opposite directions on network 2000 so that in the event that communication on either ring 16 or 18 is interrupted the information contained in signals 2030 or 2040 will reach its destination along its associated ring. Gateway 14b terminates signal 2040 to prevent interference with signal 2040 being added at ADN 1000a.

Although an example method is illustrated, the present invention contemplates two or more steps taking place substantially simultaneously or in a different order. In addition, the present invention contemplates using methods with additional steps, fewer steps, or different steps, so long as the methods remain appropriate for multiplexing optical traffic channels in an optical ring network.

Furthermore, although the present invention has been described with several embodiments, a multitude of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. An optical network system comprising a first optical network and a second optical network, each network comprising at least one optical gateway node and a plurality of passive optical add/drop nodes, the system comprising:
   a first gateway node coupled to the first optical network and operable to:
      forward a first copy of a received optical signal to a multiplexer/demultiplexer unit of the first gateway node, the multiplexer/demultiplexer unit operable to multiplex the first copy into one or more constituent wavelengths and to selectively forward or terminate the traffic in each wavelength of the first copy;
      forward a second copy of the received optical signal to a regeneration element of the first gateway node, the second copy thus bypassing the multiplexer/demultiplexer unit;
      selectively forward or terminate the traffic in each wavelength of the first copy at the multiplexer/demultiplexer unit; and
      selectively perform one of the following on the traffic in each wavelength of the second copy at the regeneration element: terminate the traffic, forward the traffic to the second optical network, or forward the traffic on the first optical network after regenerating the traffic; and
   a second gateway node coupled to the second optical network and operable to:
      receive the traffic contained in the second copy forwarded from the first gateway node; and
      add the traffic contained in the second copy forwarded from the first gateway node to a ring of the second optical network.

2. The system of claim 1, wherein the regeneration element is further operable to selectively forward the traffic after regenerating and converting the wavelength of the traffic.

3. The system of claim 1, wherein at least one network comprises a plurality of subnets, each subnet comprising a plurality of add/drop nodes, the number of subnets equal to the number of gateway nodes in the network.

4. The system of claim 3, wherein, within each subnet, each add/drop node is operable to add and drop traffic independent of the channel spacing of the traffic.

5. The system of claim 1, wherein each add/drop node comprises one or more optical couplers associated with each ring of the network, the optical couplers operable to passively add and drop traffic to and from the associated ring.

6. The system of claim 1, wherein the first gateway node comprises:
   a first optical coupler operable to receive ingress traffic on the optical ring, to forward the first copy of the received optical signal to the multiplexer/demultiplexer unit, and to forward the second copy of the received optical signal to the regeneration element; and
   a second optical coupler operable to receive traffic forwarded by the multiplexer/demultiplexer unit and the regeneration element, and further operable to combine the received traffic such that the combined signal is forwarded on the optical ring.

7. The system of claim 6, wherein the signal regeneration element comprises:
   a splitter operable to make a plurality of copies of the second copy received from the first optical coupler;
   one or more filters each operable to receive one of the plurality of copies of the second copy and to forward signals associated with one or more wavelengths of the received copy;
   one or more transponders each operable to receive the filtered signal in a particular wavelength from the one or more filters and to regenerate the signal in that wavelength; and
   a combiner operable to receive and combine the regenerated signals and to forward the combined signals to the second optical coupler.

8. The system of claim 7, wherein one or more of the transponders are further operable to convert the wavelength of the received signal.

9. The system of claim 1, wherein the multiplexer/demultiplexer unit comprises:
   a demultiplexer operable to demultiplex the second copy of the received optical signal into a plurality of constituent wavelengths;
   a switch operable to selectively forward or terminate each wavelength; and
   a multiplexer operable to combine the forwarded wavelengths.

10. The system of claim 1, wherein each wavelength that is regenerated by the signal regeneration element is terminated by the multiplexer/demultiplexer unit.

11. The system of claim 1, wherein the first gateway node is further operable to add traffic to the first network that is received from the second gateway node coupled to the second network.

12. The system of claim 1, wherein the traffic forwarded to the second optical network from the first gateway node is received at an interconnection module operable to couple the first network to the second network, the interconnection module comprising:
   an optical coupler coupled to a ring of the first optical network and operable to:
      receive the traffic contained in the second copy forwarded to the second optical network from the first optical network;
      split the traffic contained in the second copy into substantially identical copies; and
      forward a copy of the traffic contained in the second copy to a second optical network; and
   a switch coupled to the second optical network and operable to:
      receive the copy of the traffic forwarded by the optical coupler; and
      selectively forward the copy of the traffic to an optical ring of the second optical network.

* * * * *